USO09551800B2

United States Patent
Rohnke et al.

(10) Patent No.: US 9,551,800 B2
(45) Date of Patent: Jan. 24, 2017

(54) DEVICE AND METHOD FOR DEBLENDING SIMULTANEOUS SHOOTING DATA USING ANNIHILATION FILTER

(71) Applicant: CGG SERVICES SA, Massy (FR)

(72) Inventors: Jonas Rohnke, Crawley (GB); Gordon Poole, East Grinstead (GB); Ross Haacke, Reigate (GB)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 15/142,495

(22) Filed: Apr. 29, 2016

(65) Prior Publication Data

US 2016/0245943 A1 Aug. 25, 2016

Related U.S. Application Data

(63) Continuation of application No. 14/804,820, filed on Jul. 21, 2015, now Pat. No. 9,348,051.

(60) Provisional application No. 62/050,808, filed on Sep. 16, 2014.

(51) Int. Cl.
*G01V 1/36* (2006.01)

(52) U.S. Cl.
CPC ......... *G01V 1/364* (2013.01); *G01V 2210/127* (2013.01); *G01V 2210/24* (2013.01); *G01V 2210/3246* (2013.01)

(58) Field of Classification Search
CPC .... G01V 1/364; G01V 2210/24; G01V 1/3861
See application file for complete search history.

(56) References Cited

U.S. PATENT DOCUMENTS

| | | | |
|---|---|---|---|
| 6,882,938 B2 | 4/2005 | Vaage et al. |
| 8,295,124 B2 | 10/2012 | Abma |
| 8,395,966 B2 | 3/2013 | Moore et al. |
| 2006/0250891 A1 | 11/2006 | Krohn |
| 2008/0137476 A1 | 6/2008 | Eick et al. |
| 2009/0003132 A1 | 1/2009 | Vassallo et al. |
| 2011/0194378 A1 | 8/2011 | Decker et al. |
| 2012/0155218 A1 | 6/2012 | Beasley et al. |
| 2013/0088938 A1 | 4/2013 | Aaron et al. |
| 2014/0078860 A1 | 3/2014 | Poole et al. |

OTHER PUBLICATIONS

R. Abma et al., "Separating simultaneous sources by inversion", 71st EAGE Conference & Exhibition—Amsterdam, The Netherlands, Jun. 8-11, 2009.

(Continued)

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

A device, medium and method for deblending seismic data associated with a subsurface of the earth. The method includes receiving an input dataset generated by first and second sources $S_1$ and $S_2$ that are operating as simultaneous sources; arranging the input dataset based on the firing times of source $S_1$; applying with a computing system an annihilation filter to the arranged input dataset to estimate cross-talk noise; convolving the cross-talk noise estimate with an operator to form a signal estimate using the firing times of $S_1$ and $S_2$; and generating an image of the subsurface based on the signal estimate.

21 Claims, 16 Drawing Sheets

(56) References Cited

OTHER PUBLICATIONS

P. Akerberg al., "Simultaneous source separation by sparse Radon transform", SEG 78th Annual International Meeting, Las Vegas, Nevada, Nov. 9-14, 2008.
L. Canales, "Random Noise Reduction", SEG Annual Meeting, 1984.
T. Elboth et al., "Time-frequency seismic data de-noising", Geophysical Prospecting, 2010, 58, pp. 441-453.
S. Fomel, "Application of plane-wave destruction filters", Geophysics, Nov.-Dec. 2002, vol. 67, No. 6, pp. 1946-1960.
S. Freier et al., "Application of singular value decomposition to vertical seismic profiling", Geophysics, Jun. 1988, vol. 53, No. 6, pp. 778-785.
J. Haldorsen et al., "Suppression of high-energy noise using an alternative stacking procedure", Geophysics, Feb. 1989, vol. 54, No. 2, pp. 181-190.
D. Hampson, "Inverse velocity stacking for multiple elimination", SEG 56th Annual International Meeting, Expanded Abstracts, 1986, Session:S6.7.
G. Hampson et al., "Acquisition using simultaneous sources", SEG Annual International Meeting, Las Vegas, Nevada, Nov. 9-14, 2008.
P. Herrmann et al., "De-aliased, high-resolution Radon transforms", SEG 70th Annual International Meeting, Calgary, Canada, Aug. 6-11, 2000, Expanded Abstracts, pp. 1953-1956.
W. Huaien et al., "Attenuation of Marine Coherent Noise", SEG Expanded Abstracts, 1989, pp. 1112-1114, SP 1.2.
W. Lynn et al., "Experimental investigation of interference from other seismic crews", Geophysics, Nov. 1987, vol. 52 No. 11, pp. 1501-1524.
A. Mahdad et al., "Iterative method for the separation of blended seismic data: discussion on the algorithmic aspects", Geophysical Prospecting, 2012, 60, pp. 782-801.
M. Maraschini et. al., "An iterative SVD method for deblending: theory and examples", SEG Annual International Meeting, Las Vegas, Nevada, Nov. 9-14, 2012.
M. Maraschini et al., "Source Separation by Iterative Rank Reduction—Theory and Applications", 74th EAGE Conference & Exhibition incorporating SPE Europec 2012, Copenhagen, Denmark, Jun. 4-7, 2012.
I. Moore et al., "Simultaneous source separation using dithered sources", 78th Annual International Meeting, Las Vegas, Nevada, Nov. 9-14, 2008.
R. Neelamani et al., "Coherent and random noise attenuation using the curvelet transform", The Leading Edge, Feb. 2008, vol. 27, No. 2, pp. 240-248.
C. Peng et al., "Deblending of Simulated Simultaneous Sources Using an Iterative Approach—an Experiment with Variable-depth Streamer Data", 75th EAGE Conference & Exhibition incorporating SPE Europec 2013, London, UK, Jun. 10-13, 2013, Tu 08 04.
C. Peng et al., "Shear Noise Attenuation and PZ Matching for OBN Data with a New Scheme of Complex Wavelet Transform", 75th EAGE Conference & Exhibition incorporating SPE Europec 2013, London, UK, Jun. 10-13, 2013, Tu 02 07.
G. Poole, "Multi-dimensional coherency driven denoising of irregular data", 73rd EAGE Conference & Exhibition Incorporating SPE Europec 2011, Vienna, Austria, May 23-26, 2011, G009.
R. Soubaras, "Signal-preserving random noise attenuation by the f-x projection", SEG Annual Meeting, 1994.
J. Stefani et al. "Acquisition using simultaneous sources", EAGE 69th Conference & Exhibition—London, UK, Jun. 11-14, 2007, B006.
D. Trad et al., "Fast and robust deblending using Apex Shifted Radon transform", SEG Annual Meeting, Expanded Abstracts, Las Vegas, Nevada, Nov. 9-14, 2012.
S. Treitel et al., "Some aspects of fan filtering", Geophysics, Oct. 1967, vol. 32, No. 5, pp. 789-800.
S. Trickett, "F-xy eigenimage noise suppression", Geophysics, Mar.-Apr. 2003, vol. 68, No. 2, pp. 751-759.
S. Trickett et al., "Interpolation using Hankel tensor completion", SEG International Exposition and 83rd Annual Meeting, Houston, Texas, Sep. 22-27, 2013, Expanded Abstracts, pp. 3634-3638.
S. Trickett et al., "Robust rank-reduction filtering for erratic noise", SEG Annual Meeting, Las Vegas, Nevada, Nov. 4-9, 2012.
S. Xu et al. "Seismic data regularization with anti-leakage Fourier transform", EAGE 66th Conference & Exhibition—Paris, France, Jun. 7-10, 2004, Extended Abstracts, D032.
International Search Report and Written Opinion of the International Searching Authority in corresponding International Application No. PCT/IB2015/001486 mailed Jan. 22, 2016 '(NPL reference by S. R. Trickett was submitted with an IDS dated Jul. 27, 2015).

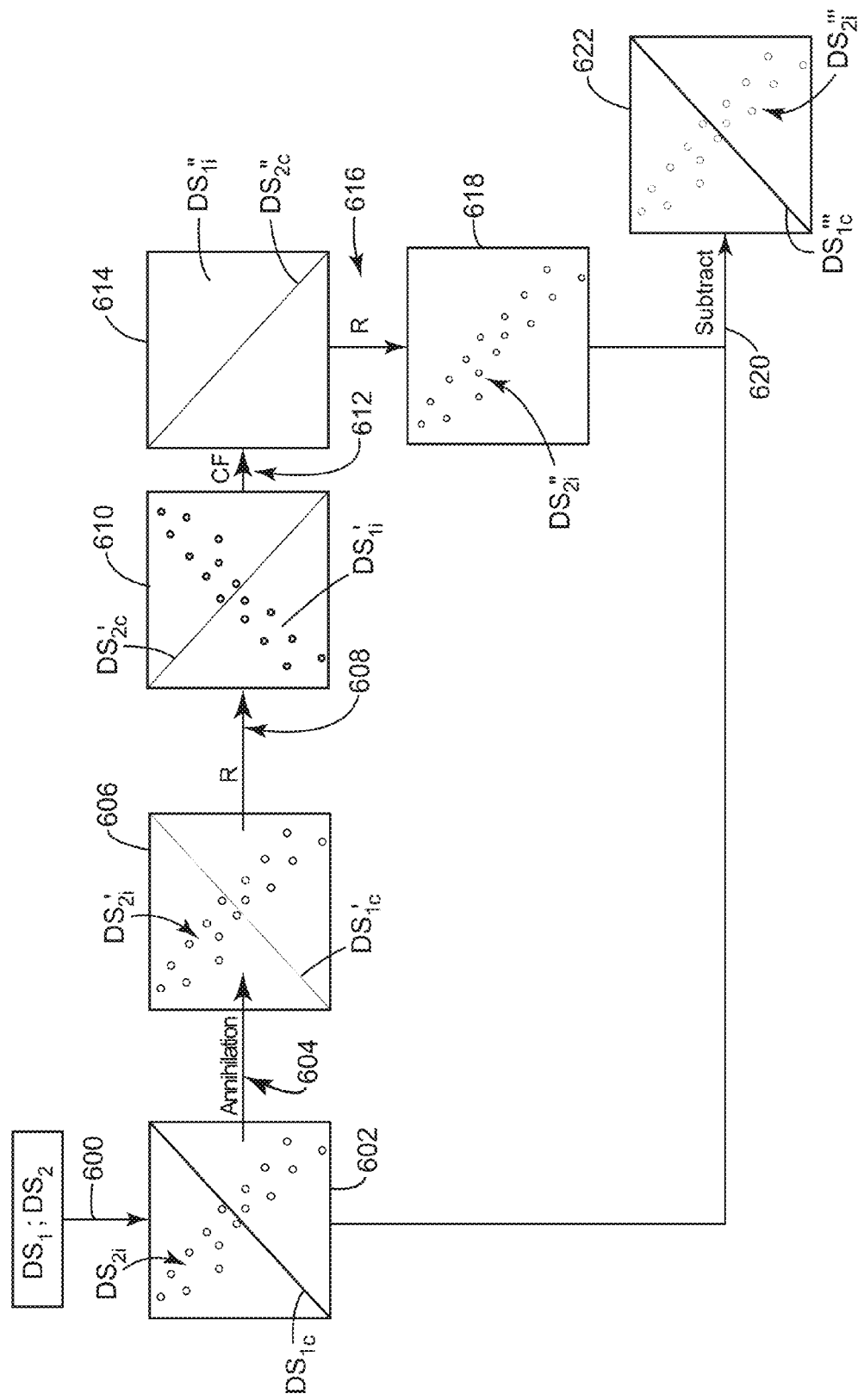

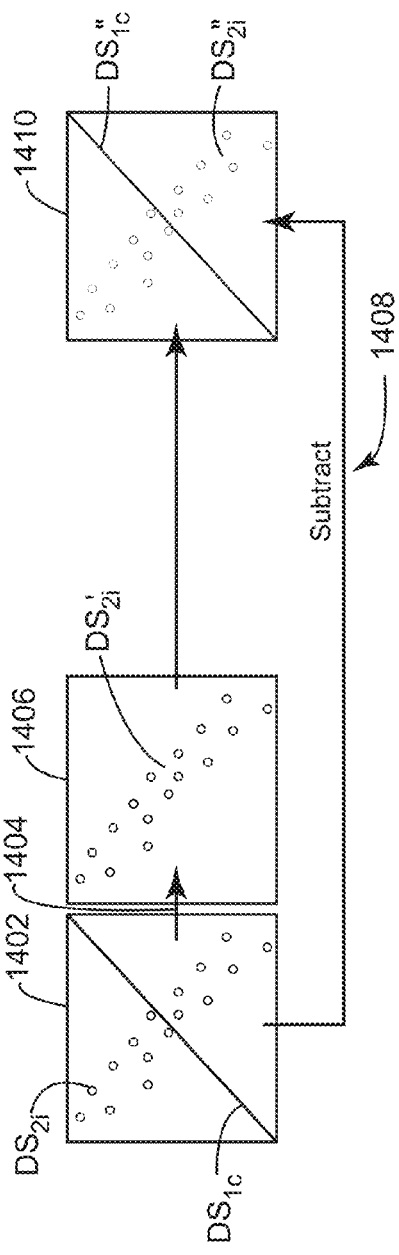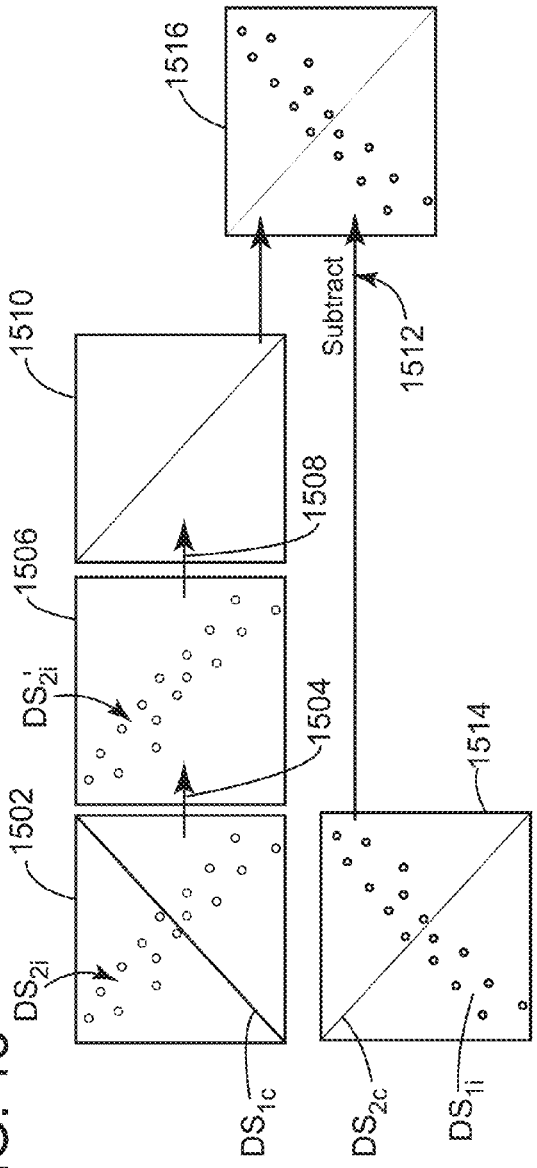

DEVICE AND METHOD FOR DEBLENDING SIMULTANEOUS SHOOTING DATA USING ANNIHILATION FILTER

CROSS REFERENCE TO RELATED APPLICATIONS

The present application claims the benefit of priority under 35 U.S.C. §119(e) to U.S. Provisional Application No. 62/050,808 filed on Sep. 16, 2014, entitled "Impulsive Noise Attenuation Using an Annihilation Filter Approach," the entire contents of which is hereby incorporated by reference.

BACKGROUND

1. Technical Field

Embodiments of the subject matter disclosed herein generally relate to methods and systems for generating, acquiring and processing seismic data and, more particularly, to mechanisms and techniques for separating seismic data simultaneously shot by two or more seismic sources that may or may not belong to the same seismic survey. The separation process is referred to as deblending.

2. Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

In the past, conventional land seismic acquisition generally employed multiple vibrators (seismic sources) acting one at a time. The vibrators are positioned at a source location and then actuated. Once activated, the vibrators generate a sweep that typically lasts between five and forty seconds and typically spans a predetermined range of frequencies. A recording system that is connected to a plurality of receivers, typically geophones for land-based seismic exploration, is employed to receive and record the response data. For reflection seismology, the record length may be considered as the sweep length plus a listening time equal to the two-way travel time of the deepest structure of interest, which is the time required for the seismic energy to propagate from the source through the earth to the deepest reflector of interest and back to the receiver. The vibrators are then moved to a new source location and the process is repeated.

For marine acquisition, a seismic acquisition system 100 includes, as illustrated in FIG. 1, a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 (also known as birds) are attached along the streamer and controlled by a controller 126 for adjusting a position of the streamer according to a survey plan.

Source array 130 has plural source elements 136, which are typically air guns. The source elements are attached to a float 137 to travel at desired depths below the water surface 104. The source elements attached to float 137 form a sub-array. Source array 130 may have multiple sub-arrays, typically three. Traditionally, vessel 102 tows two source arrays 130 and 130', which may be identical. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128. The above configuration may be modified to replace the streamers with ocean-bottom receivers in an ocean bottom survey (OBS). These may be ocean bottom nodes (OBN) or ocean bottom cables (OBC). In this case, one or more vessels tow only seismic source arrays while the seismic receivers, which are part of the OBS, are stationary on the ocean bottom. The seismic receivers record the seismic signals and store them on a local memory. In the OBN case, the recorded seismic data is then retrieved from each OBN and processed as discussed later.

When the source (either land source or marine source) is fired with standard data acquisition, the subsequent recording time is defined so that all useful reflected/diffracted energy is recorded before the next shot fires. This delay time imposes constraints on the acquisition rate and, hence, increases the cost and length of the acquisition process.

To reduce acquisition time, it is possible to simultaneously shoot sources. Acquisition of simultaneous source data means that the signals from two or more sources interfere at least for part of the record; one source is shot during the listening time of another source so that a same seismic receiver receives during that listening time information corresponding to both sources. By acquiring data in this way, a process known in the field as simultaneous source acquisition, the time taken to shoot a data set and acquisition costs are reduced. As an alternative to reducing acquisition time, a higher density data set may be acquired at the same time. For such data to be useful, it is necessary to develop processing algorithms to handle source interference (crosstalk noise). The separation of energy from distinct seismic sources is referred to here as a deblending process.

Simultaneous source acquisition can be performed in land, transition, and marine environments (e.g., Ocean Bottom Node (OBN), Ocean Bottom Cable (OBC), towed streamers, autonomous underwater vehicles, etc.), with continuous or non-continuous recording. FIG. 2A shows traces recorded in time for various shot point (SP) locations, where the successive firing time of SP excitations is equal to or larger than a listening time. FIG. 2B illustrates the concept of continuous recording for simultaneous shooting acquisition, i.e., reflected signals from $SP_1$ are recorded during the listening time for $SP_2$.

The most common methodology for using the simultaneous data of FIG. 2B is to separate the energy associated with each source (to deblend) as a preprocessing step, and then to proceed with conventional processing steps.

To make the separation easier, it is generally advantageous to use a variety of different source signals, for example, different vibroseis sweeps or pseudo-random sweeps. When energy from a given source is time-aligned, this also allows a designature operator to be applied that focuses the energy of that source while keeping energy from other sources at least partially dispersed. The designature operator may be reversed (e.g., convolving by the source signature) in the event energy is reverse time-aligned. The process of designature or resignature may optionally be included whenever time alignments or time shifts are used.

With impulsive source acquisition, e.g. airgun marine acquisition, it is common to desynchronize timing between the two sources such that when data from one source is time-aligned (see data 202 in FIG. 2B), energy 204 from other sources appears with an irregular timing.

The deblending process is closely related to seismic interference noise attenuation. Therefore, methods such as those described in Lynn et al., 1987, Haldorsen and Farmer 1989, and Huaien et al., 1989 (see the end of the specification for more details about these references), for example, can be used to remove blending noise from the data. The method described in Huaien et al., (1989) closely resembles methods specifically developed to deblend simultaneous shooting data by sorting the data into a certain domain, applying a coherency enhancing filtering process, and sorting the data back to the original domain. In the literature, methods specifically developed for the deblending of simultaneous shooting data generally fall into one of the categories now discussed.

One deblending approach is known as separation in a model domain, which is illustrated by Trad et al., 2012. This paper proposed a method that separates signal and cross-talk by muting in the apex-shifted Radon domain. Another deblending approach is impulsive denoising. This denoising method (see, e.g., Stefani et al., 2007) uses the fact that when data is sorted into any domain other than common shot, the cross-talk noise from other sources has a random timing, as illustrated in FIG. 3 from Hampson et al., 2008. This random timing allows the use of impulsive noise attenuation techniques, which are already available and used in other processing steps, such as, for example, swell noise attenuation. Still another approach is iterative coherency enhancement/denoising. Iterative signal enhancement/denoising techniques (e.g., Vaage, 2003; Abma and Yan, 2009; Maraschini et al., 2012; Maraschini et al 2012b; Mandad, et al., 2012; and Peng et al., 2013) rely on the fact that cross-talk noise on some traces is always a duplication of signal energy on other traces. A signal estimate for one source is used to reduce the level of cross-talk for other sources. Another approach is simultaneous modeling of energy from all sources. This modeling scheme (e.g., Akerberg et al., 2008; and Moore et al., 2008) solves the relationship between source energy and cross-talk noise by designing a transform domain for each source or spatial area (e.g., tau-p domain, Fourier domain, etc.) such that when it is reverse-transformed and re-blended, the raw input data is reconstructed accurately in a least-squares sense. Once the transform domain has been calculated, the final step to deblend the data requires application of reverse transform without re-blending.

However, existing methods inherently damage the signal during the process of removing cross-talk. Thus, there is a need to develop a method capable of processing blended seismic data while not being limited as noted above.

SUMMARY OF THE INVENTION

According to an exemplary embodiment, there is a method for deblending seismic data associated with a subsurface of the earth. The method includes receiving an input dataset generated by first and second sources $S_1$ and $S_2$ that are operating as simultaneous sources; arranging the input dataset based on the firing times of source $S_1$; applying with a computing system an annihilation filter to the arranged input dataset to estimate cross-talk noise; convolving the cross-talk noise estimate with an operator to form a signal estimate using the firing times of $S_1$ and $S_2$; and generating an image of the subsurface based on the signal estimate.

According to another embodiment, there is a computing device for deblending seismic data associated with a subsurface of the earth. The computing device includes an interface for receiving an input dataset generated by first and second sources $S_1$ and $S_2$ that are operating as simultaneous sources and a processor connected to the interface. The processor is configured to arrange the input dataset based on the firing times of source $S_1$; apply with a computing system an annihilation filter to the arranged input dataset to estimate cross-talk noise; convolve the cross-talk noise estimate with an operator to form a signal estimate using the firing times of $S_1$ and $S_2$; and generate an image of the subsurface based on the signal estimate.

According to still another exemplary embodiment, there is a computer-readable medium including computer-executable instructions, wherein the instructions, when executed by a processor, implement instructions for deblending seismic data associated with a subsurface of the earth. The instructions implement the method steps discussed above.

BRIEF DESCRIPTION OF THE DRAWINGS

For a more complete understanding of the present invention, reference is now made to the following descriptions taken in conjunction with the accompanying drawings, in which:

FIG. 6 is a flowchart of a method for deblending seismic data with an annihilation filter;

FIGS. 10A-1 illustrate a rearranging flow of seismic data;

FIG. 14 is a flowchart of a method for iteratively applying an annihilation filter for deblending seismic data;

FIG. 15 is a flowchart of another method for iteratively applying an annihilation filter for deblending seismic data;

DETAILED DESCRIPTION OF THE INVENTION

Figure 1:
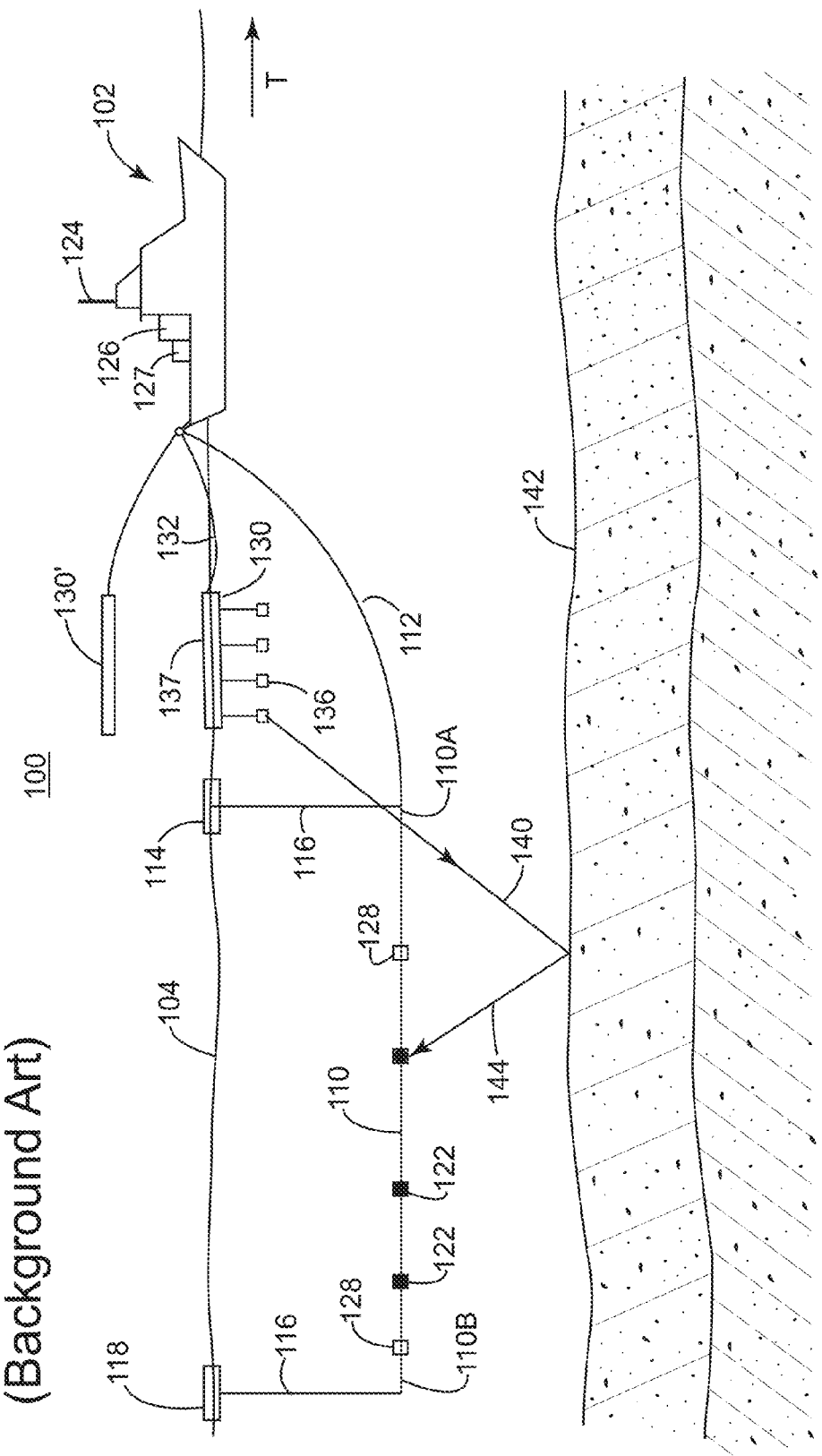
FIG. 1 illustrates a marine seismic survey system.
Figure 2A:
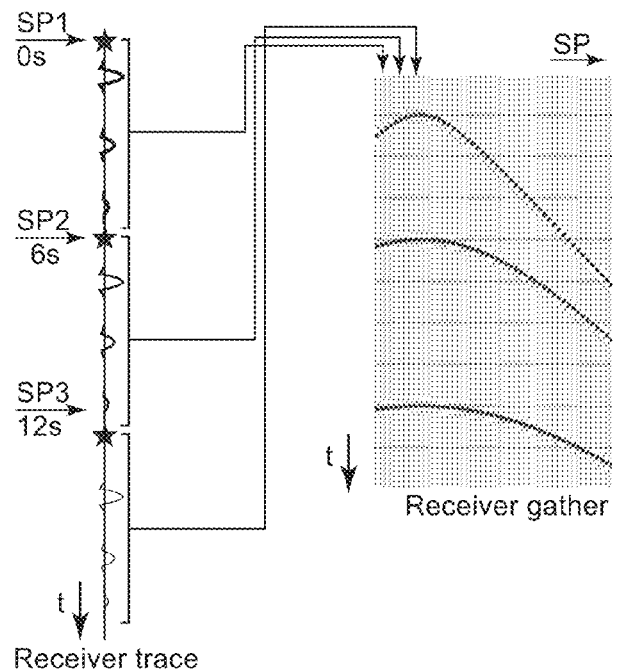
FIG. 2Aa is a graph of seismic data recorded when a single source is fired.
Figure 2B:
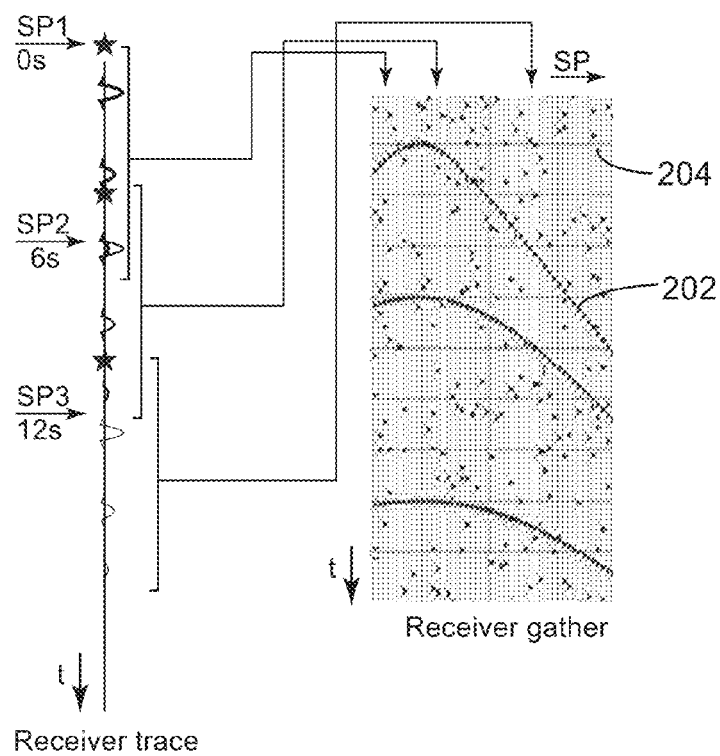
FIG. 2B is a graph of seismic data recorded when two sources are simultaneously fired.
Figure 3:
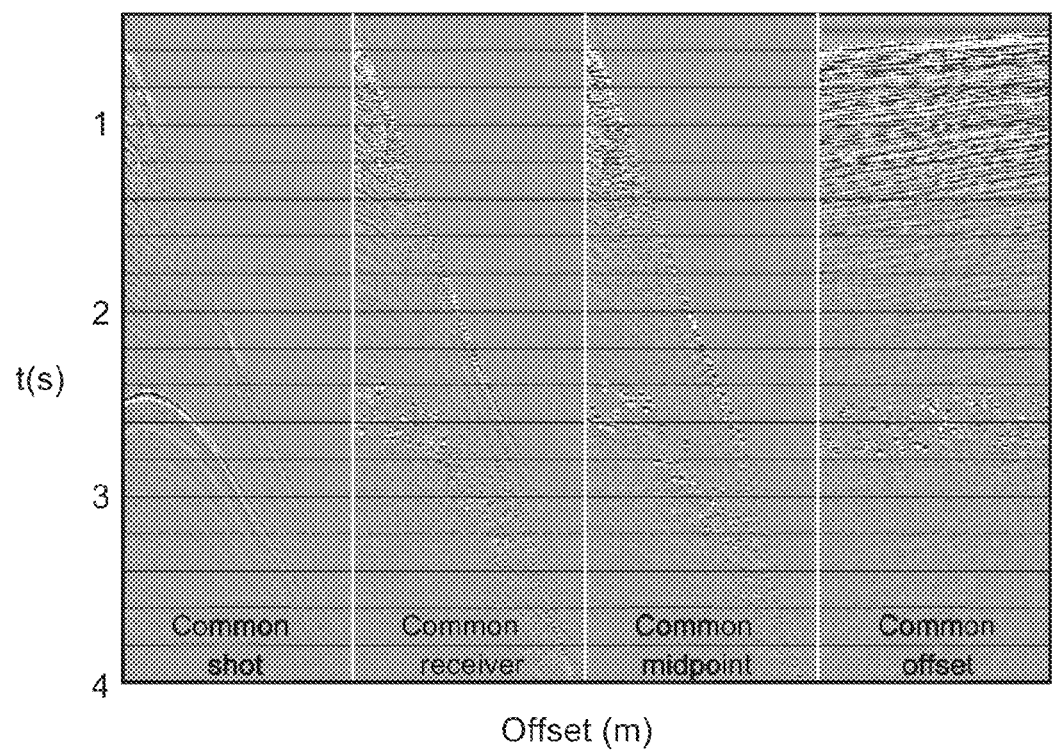
FIG. 3 is a graph illustrating the same seismic data plotted in various domains.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to applying an annihilation filter to seismic data for removing coherent energy recorded with two seismic sources firing simultaneously. However, the embodiments to be discussed next are not limited to an annihilation filter, but other annihilation methods may be used, for example, an annihilation operator. The annihilation operator may involve the application of a number of signal processing techniques designed, at least in part, to attenuate coherent energy. Also, the embodiments are not limited to only two simultaneous sources, but they may be applied to more than two simultaneous sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for deblending seismic data acquired by simultaneous shooting. The acquired dataset contains information related to energy from a first as well as from a second source. The data may be arranged into traces based on the firing times of source $S_1$ and/or source $S_2$. Each trace will contain energy originating from the firing source. In addition, the trace may contain energy originating from another source excitation. The energy contributions from source $S_1$ and source $S_2$ may be referred to sub-sets of the acquired dataset, referred to as $DS_1$ and $DS_2$ respectively. In one application, the method includes receiving an input dataset generated by first and second sources $S_1$ and $S_2$ that are operating as simultaneous sources; arranging the input dataset based on the firing times of source $S_1$; applying with a computing system an annihilation filter to the arranged input dataset to estimate cross-talk noise; convolving the cross-talk noise estimate with an operator to form a signal estimate using the firing times of $S_1$ and $S_2$; and generating an image of the subsurface based on the signal estimate. The operator represents a filter that transforms energy arranged based on the firing times of source $S_1$ to equivalent energy arranged based on the firing times of source $S_2$.

As discussed in the background section, simultaneous sources have high potential for reducing the cost of acquisition, especially for data sets with wide/full azimuth and long offset coverage. Alternatively, with similar cost to conventional acquisition, they have the potential to improve the quality of the image, with denser shot spacing resulting in better signal-to-noise ratios.

Prior to discussing the deblending algorithm in more detail, some clarifications regarding the concept of "simultaneous source" shooting are believed to be in order. Simultaneous source shooting is used in this document to describe the case that the energy relating to two or more sources interferes within a listening time of interest. An example of such simultaneous shooting is when source array $S_1$ is shot at time $t_0$ and source array $S_2$ is shot at time $t_0+/-\Delta t$, where $\Delta t$ has a magnitude less than the listening time of a single source and may vary from shot to shot for example with a random timing. The randomized timing may be achieved by shooting on a regular positioning with additional random timing, or by designing irregular acquisition positions which would invoke a randomness to the timing (assuming, for example, a constant source-vessel velocity).

Alternatively to an acquisition scheme where a first source is fired with random timing relative to a second source for a same seismic survey, the two sources may be operated independently. The two sources may be operating as part of the same acquisition or may relate to more than one acquisition. In this case, vessel speeds, line change times, and/or other factors may provide a randomness to the shooting times. Thus, interference noise produced by the second source array may arrive at any point during the listening time of the first source array. There may also be time durations where only one source is firing. It is possible that a subset of the data may be affected by cross-talk noise while the remainder is not. The acquisition may also combine independent acquisitions and randomized timing.

According to an embodiment, the inventors have observed that signal degradation is avoided or reduced, compared to traditional deblending methods, if the filter used in the deblending process is an annihilation filter rather than a coherency filter. The annihilation filter is designed to remove as much coherent energy as possible, leaving behind the substantially incoherent part of the recorded seismic data. A coherency filter is designed to remove as much incoherent energy as possible, leaving behind the substantially coherent part of the recorded seismic data.

Figures 4A, 4B, 4C:
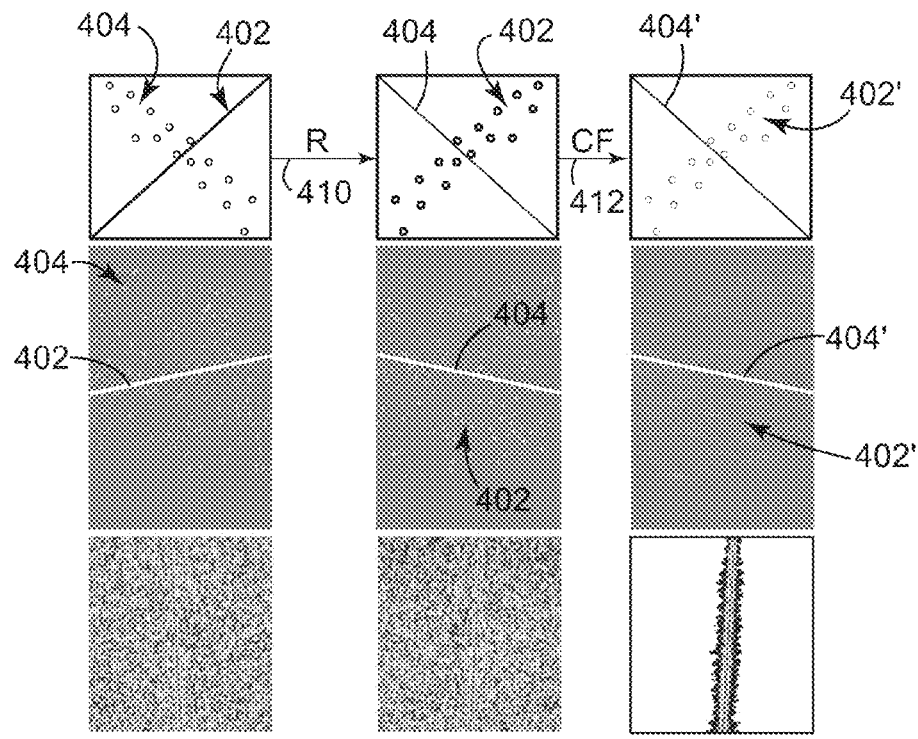
FIGS. 4A-C show seismic data processed with a coherency filter.

To illustrate the different results achieved by applying a coherency filter versus an annihilation filter to seismic data, FIG. 4A shows a dataset consisting of two sub-sets 402 and 404 recorded by a same seismic receiver but originating from the simultaneous actuation of source arrays $S_1$ and $S_2$ respectively. The two sub-sets may relate to a single seismic data set. Note that the top panel shows the seismic data in a cartoon form for clarity, the middle panel shows the data plotted in the time-space (t-x) domain, and the bottom panel shows the data plotted in the frequency-wavenumber (f-k) domain. Both data sub-sets 402 and 404 are synthetic. In FIG. 4A, both data sub-sets are aligned relative to the shooting times of first source array $S_1$. For this reason, first data sub-set 402 appears coherent while second data sub-set 404 is scattered. If the two data sub-sets are rearranged (indicated by symbol R in the figures), in step 410, by applying a time shift that aligns energy relative to the shooting times of the second source array $S_2$, the second data sub-set 404 is nicely aligned while first data sub-set 402 is now scattered. When a coherency filter is applied in step 412, first data sub-set 402' is attenuated while the coherent second data sub-set 404' is preserved as illustrated in FIG. 4C.

Figures 5A, 5B, 5C:
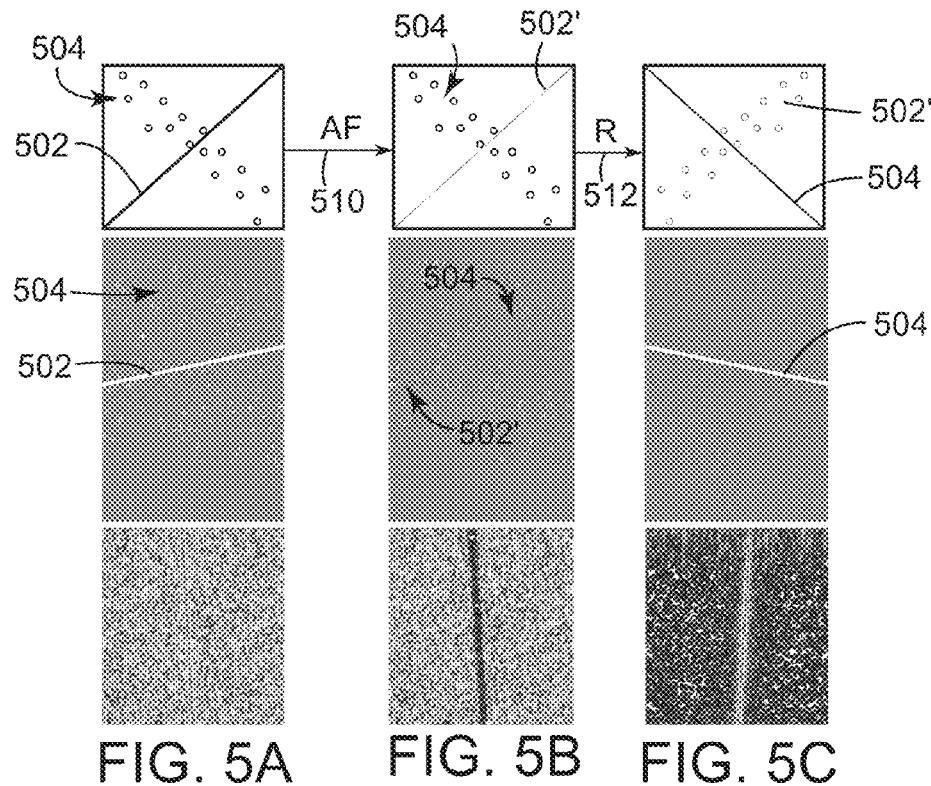
FIGS. 5A-C show the same seismic data processed with an annihilation filter.

In contrast, application of the annihilation filter is illustrated in FIGS. 5A-C. FIG. 5A shows first and second seismic data sub-sets 502 and 504, which correspond to data sub-sets 402 and 404, respectively. In step 510, instead of aligning the data according to second source array $S_2$, an annihilation filter is applied so that filtered data sub-set 502' is visibly attenuated (removed) while second data sub-set 504 is substantially unchanged, as observed in FIG. 5B. In step 512 both sub-sets of data are aligned based on the shootings of second source array $S_2$, which results in the second sub-set of data 504 being well-preserved while the first sub-set of data 502' is attenuated, as noted in FIG. 5C. The result in FIG. 5C is different from that in FIG. 4C because the residual crosstalk noise 502 and 402 and the properties and fidelity of the signal estimates 504 and 404 are different in these two cases.

While coherency filters are known in the art as discussed next, annihilation filters are relatively less common. Fomel (2002) discloses a plane-wave destructor, and this is one example of an annihilation filter. With some modification, the prediction-error filter of Canales (1984) may also be re-defined as an annihilation filter. The projection filter in Soubaras (1994) is another example of a filter which, with some modification, can be used to estimate the incoherent part of the data while removing as much of the coherent energy as possible. The annihilation filtering may involve sparse inversion which may include time and/or frequency domain weights in the model and/or data domains. Data domain weights may be designed to penalize noisy segments of the input data, for example, based on an estimated signal to noise ratio. Model and/or data domain weights may be designed to increase the sparseness of the model or data representation. Model and/or data weights may be iteratively re-defined during the inversion process.

Examples of coherency filters include:
Anti-leakage Fourier or tau-p transform or similar, e.g., Xu et al (2004), Poole (2011);
Rank Reduction based methods, e.g., Trickett et al., (2003);
Robust Rank Reduction methods, e.g., Trickett et al., (2012);
Rank Reduction Tensor methods, e.g., Trickett et al., (2013);
Singular Value Decomposition, e.g., Freire and Ulrych (1988);
Curvelets, Ridglets, Contourlets, Wavelets, High Angular Resolution Complex Wavelets, e.g., Neelamani (2008), Peng (2013);
FK filter and polygon rejection/selection, e.g., Tritel et al., (1967);
Time Frequency denoising, e.g., Elboth et al., (2010); and
Radon domain filtering (linear, parabolic, hyperbolic, shifter hyperbola), e.g., Hampson (1986) or Herrmann et al., (2000).

Any of the above schemes employing minimization or inversion or optimization may use the L2, L1, L0, Cauchy, Nuclear or any other norm. The sparseness weights may be initially derived on low-frequency data to avoid aliasing of higher frequency energy.

In one embodiment, an annihilation filter may be calculated based on one or more of the above coherency filters, for example, using relation AF=f(CF), where f is a function, AF is the annihilation filter and CF is a coherency filter. In other embodiments, annihilation filters may be calculated without use of coherency filters and independently of a coherency-enhancing step.

Next, novel methods for deblending simultaneously shot seismic data are discussed. While annihilation filters have been known in the past, the novelty of the following methods resides in the combination of these filters with other elements (e.g., another annihilation filter or a coherency filter as will be discussed later) for denoising the seismic data. Those skilled in the art would know that such methods not only help improve the accuracy of the subsurface image, but also make possible acquiring seismic data in a shorter time at lower cost. By improving the accuracy of the subsurface image, an oil and gas company would have a better sense of where to drill a next well, thus improving the technological process of drilling.

Prior to discussing the above-noted methods, some context is believed to be in order. Blended data (i.e., simultaneously shot seismic data) can be acquired in numerous ways, including: land, marine, transition area acquisition, one vessel or multi-vessel, independent simultaneous shooting or dithered acquisition (random or optimized dither timings), with continuous or segmented recordings.

The source array type to be used to generate the seismic data can be, but is not limited to, any of the following: land vibrator, dynamite, air gun, sparker, boomer, water gun, marine vibrator, dynamite, a mixture of source types.

The seismic receiver to be used for recording seismic data can be, but is not limited to, any of the following: geophone (x and/or y and/or z and/or another arbitrary orientation), hydrophone, accelerometer, particle motion sensor, particle velocity sensor, particle rotation sensor, differential pressure sensor. The sensors can be used separately or in combination.

The recorded seismic data may be spatially sampled regularly or irregularly (e.g., random sampling or optimized sampling).

The methods to be described below can be extended to include additional operations including, but not limited to, any of the following: designature and resignature, source/receiver deghosting, denoise, demultiple, obliquity correction, receiver calibration, interpolation.

According to an embodiment, an annihilation filter can be applied followed by a coherency filter for deblending the data. As illustrated in FIG. 6, in step 600, first and second seismic data sub-sets $DS_1$ and $DS_2$ are received for processing. The processing takes place in a dedicated computing system, as will be discussed later. In step 602, the two data sub-sets are arranged, e.g., time-aligned based on the shooting times of first source array $S_1$. As previously discussed, optional source shaping (e.g., designature) may be applied to make $S_1$ energy more impulsive. Of course, the data sub-sets may be time-aligned based on the second or other source. The first data sub-set $DS_{1c}$ appears as coherent energy while the second data sub-set $DS_{2i}$ appears as incoherent energy. Sub-indexes "c" and "i" are used herein to indicate that the energy is aligned to coherent or incoherent, respectively. In step 604, the annihilation filter is applied to both sub-sets of data. As a result of this step, the first data sub-set is attenuated as represented by $DS_{1c}'$, while second data sub-set $DS_{2i}'$ (cross-talk noise estimate) is largely unchanged (i.e., $DS_{2i}$ is substantially the same as $DS_{2i}'$), as illustrated by 606.

In step 608, the resulting first and second data sub-sets $DS_{1c}'$ and $DS_{2i}'$ are time-aligned, based on second source $S_2$, resulting in second data sub-set $DS_{2i}'$ being coherent and first data sub-set $DS_{1i}'$ being incoherent, as illustrated in 610. As discussed earlier, this step may optionally include reversing a shaping filter applied to $S_1$ and applying a shaping filter to $S_2$ to make $S_2$ energy more impulsive. Then, in step 612, a coherency filter is applied, which results in new first and second data sub-sets $DS_{1i}''$ and $DS_{2i}''$ as illustrated in 614. Note that second sub-set of data $DS_{2c}''$ has been maintained substantially unchanged by the application of the coherency filter (i.e., $DS_{2c}''$ is substantially the same as $DS_{2c}'$) while first data sub-set $DS_{1i}''$ has been essentially eliminated because the coherency filter removed the incoherent energy. The data is rearranged in step 616, for example, by applying a new time shift to re-align second sub-set of data $DS_{2c}''$ based on the timing of first source array $S_1$, resulting only in incoherent $DS_{2i}''$ data. This data is removed in step 620 from original data sub-sets $DS_{1c}$ and $DS_{2i}$, to obtain, as illustrated in 622, coherent first data sub-set $DS_{1c}'''$, and attenuated incoherent second data sub-set $DS_{2i}'''$. One skilled in the art would note that $DS_{2i}'''$ is much attenuated relative to $DS_{2i}$, which means that the data has been deblended.

Figure 7:
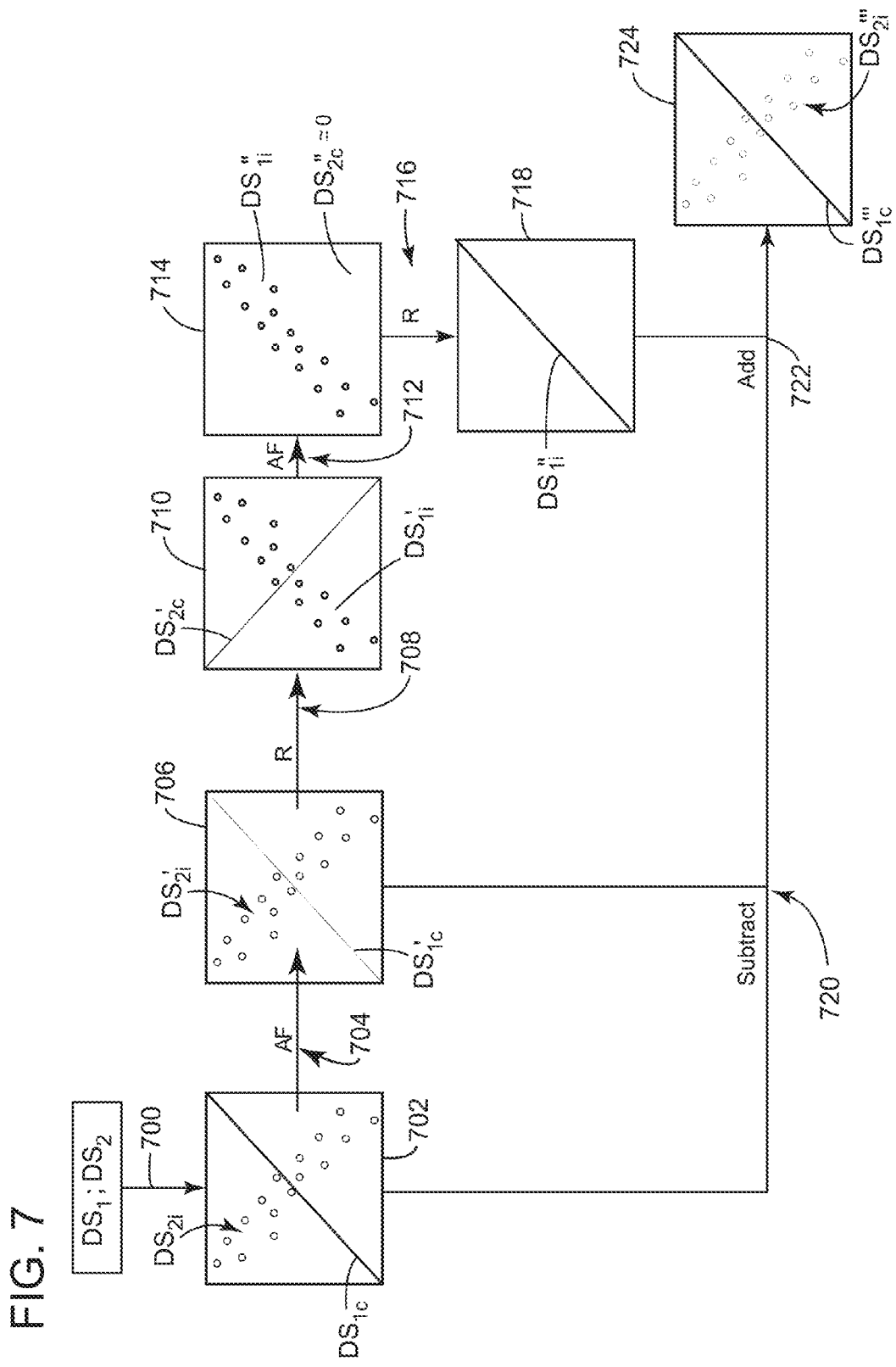
FIG. 7 is a flowchart of another method for deblending seismic data with an annihilation filter.

In another embodiment illustrated in FIG. 7, the annihilation operator is used twice, without use of the coherency filter as in the embodiment of FIG. 6. More specifically, as illustrated in the figure, the first and second seismic data sub-sets $DS_1$ and $DS_2$ are received in step 700. In step 702, the data sub-sets are aligned based on the shooting times of first source array $S_1$, resulting in coherent first data sub-set $DS_{1c}$ and incoherent second data sub-set $DS_{2i}$. In step 704, a first annihilation filter is applied to both data sub-sets, resulting in first data sub-set $DS_{1c}'$ that is attenuated (because the annihilation filter attenuates coherent data and leaves incoherent data largely unchanged) and second data sub-set $DS_{2i}'$ that is largely unchanged, as illustrated in 706. In step 708 the data is rearranged by applying a time shift to align the data based on source array $S_2$, resulting in $DS_{1i}'$ and $DS_{2i}'$ as illustrated in 710, and in step 712 a second annihilation filter (which may be the same as the first annihilation filter or different) is applied to the data, which results in first data sub-set $DS_{1i}''$ being maintained substantially unchanged (i.e., $DS_{1i}''$ is substantially the same as $DS_{1i}'$) and second data sub-set $DS_{2c}''$ being essentially eliminated, as shown in 714. Another time shift is applied in step 716 to align first data sub-set $DS_{1c}''$ based on source array $S_1$, as illustrated in 718.

To deblend the data, the original first and second data sub-sets $DS_{1c}$ and $DS_{2i}$ are input in step 720, and the incoherent second data sub-set $DS_{2i}'$ that resulted from annihilation step 704 is subtracted. In step 722, coherent first data sub-set $DS_{1c}''$ from step 716 is added to the result of step 720 to obtain the deblended first data sub-set $DS_{1c}'''$, as shown in 724. Note that second data sub-set $DS_{2i}'''$ is strongly attenuated in the final deblended result in 724.

Figure 8:
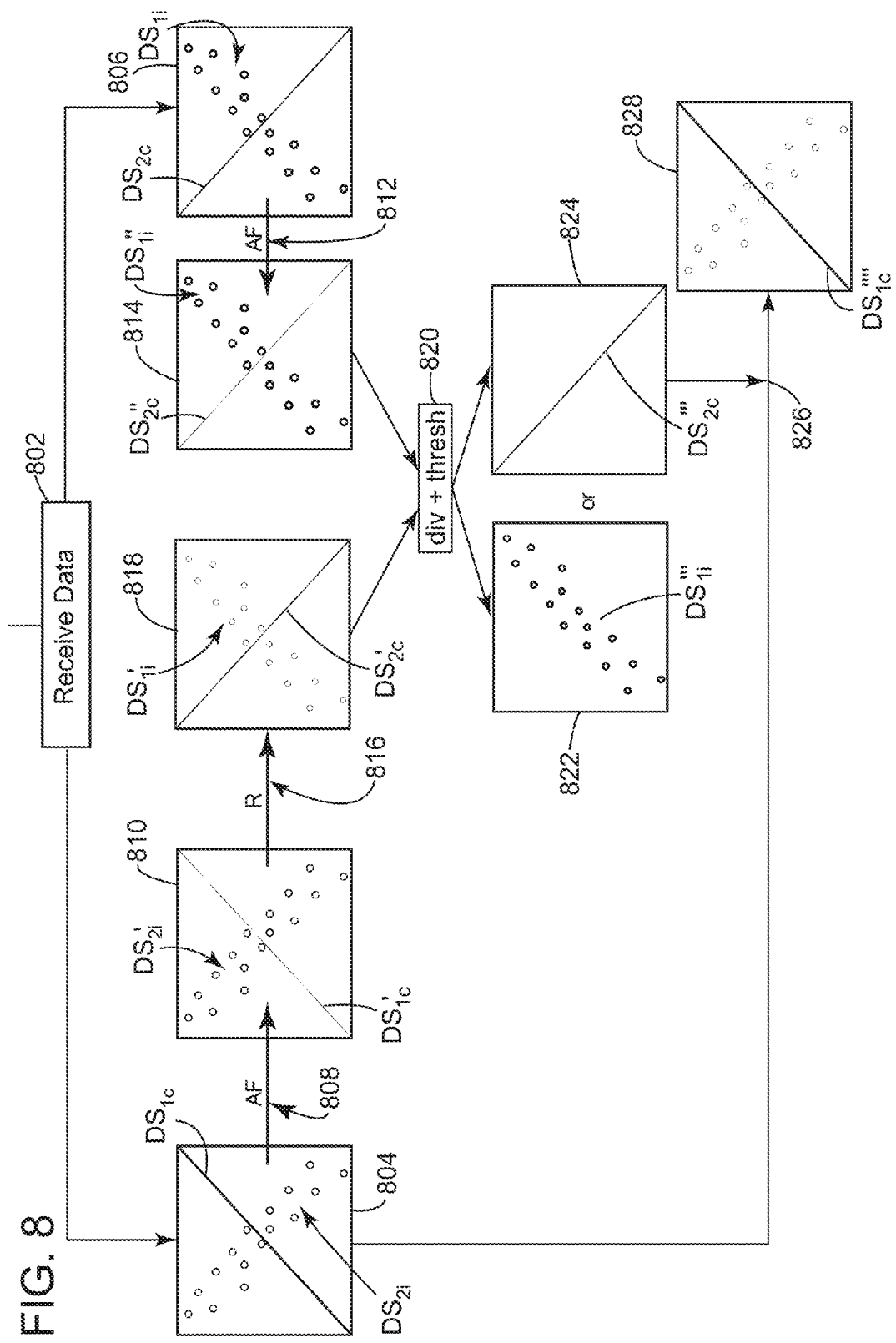
FIG. 8 is a flowchart of still another method for deblending seismic data with an annihilation filter.

According to another embodiment illustrated in FIG. 8, it is possible to apply separate annihilation filters to the data aligned based on the shooting times of first source array $S_1$ and the data aligned based on the shooting times of first source array $S_2$ and then to combine the results, for example, by division followed by thresholding, to create an estimate for either the coherent source array $S_2$ or the incoherent source array $S_1$ (the cross-talk noise). These results can then be used to estimate (for example, by using convolution) the signal in the data, which is then used to image the earth's subsurface as now discussed in more detail.

In step 802, first and second seismic data sub-sets $DS_1$ and $DS_2$ are received. This data is arranged based on the shooting times of the first source array $S_1$ to obtain coherent first data sub-set $DS_{1c}$ and incoherent second data sub-set $DS_{2i}$ as illustrated in 804, and to obtain incoherent first data sub-set $DS_{1i}$ and coherent second data sub-set $DS_{2c}$, based on second source array $S_2$, as illustrated in 806. A first annihilation filter is applied in step 808 to the data illustrated in 804 to attenuate the coherent energy of the first data sub-set, resulting in first data sub-set $DS_{1c}'$ as shown in 810, and maintaining substantially unchanged second data sub-set $DS_{2i}'$, i.e., $DS_{2i}$ is substantially the same as $DS_{2i}'$. At the same time or at a different time, a second annihilation filter is applied in step 812 to the original first and second data sub-sets aligned based on the second source array to attenuate coherent energy associated with the second data sub-set, thus resulting in $DS_{2c}''$, and substantially maintaining unchanged the first data sub-set, which is now $DS_{1i}''$, as illustrated in 814. Note that as previously discussed, the first and second annihilation filters may be the same or different.

The results from 810 are time-shifted in step 816 based on second source array $S_2$, which results in coherent second data sub-set $DS_{2c}'$ and incoherent first data sub-set $DS_{1i}'$, as illustrated in 818. The data illustrated in 818 is now similarly aligned to the data shown in 814, and, thus, these sub-sets of data can now be combined. One possibility is to combine in step 820 data sub-sets $DS_{2i}'$, $DS_{1i}''$ and $DS_{2c}''$ by division and thresholding to create an estimate for either the incoherent energy of source array $S_1$, i.e., $DS_{1i}'''$ as illustrated in 822, or the coherent energy of source array $S_2$, i.e., $DS_{2c}'''$ as illustrated in 824. Then, one of these two results may be subtracted (after appropriate time alignment) in step 826 from original data $DS_1$ and $DS_2$ to obtain, for example, the coherent energy associated with first data sub-set $DS_{1c}'''$ as shown in 828. Those skilled in the art would understand that other mathematical operations may be performed in step 820 for separating incoherent or coherent energy associated with the source arrays.

FIGS. 6-8 illustrate methods of deblending seismic data using annihilation filters applied to distinct data sub-sets $DS_1$ and $DS_2$. With minor modifications, the same methods may be used with a dataset recorded continuously, for at least the period of simultaneous shooting. Such cases include towed streamer, ocean-bottom cable and node acquisitions, or land acquisitions. The shifting process, 816 in FIG. 8 for example, is then a process of forming the continuous record (this may include fold compensation), re-forming the gather (such as a common-receiver gather, now containing crosstalk as well as coherent signal), and subtracting the data before shifting from the data after shifting.

Different deblending flows are shown in FIGS. 4 to 12. The deblending flows may include the following steps:

1) Receive input data;
2) Organize the input data into trace segments based on source firing times. This step may optionally include a source shaping filter (e.g., designature) to make the energy more impulsive;
3) Estimate cross-talk noise using an annihilation filter (AF);
4) Convolve the estimated cross-talk noise with an operator to form a signal estimate using the firing times; In one application, the operator represents a filter that transforms energy arranged based on the firing times of source $S_1$ to equivalent energy arranged based on the firing times of source $S_2$. However, in another application, the operator optionally encodes a source signature of one of the sources at the same time as applying a time shift. Those skilled in the art would understand that the operator may take other forms.
5) Add the signal estimate into an output dataset;
6) Subtract outputs of steps (3) and (4) from (2) to estimate a residual;
7) Go back to step (2) with the output from step (6) as the new input.

Figure 9:
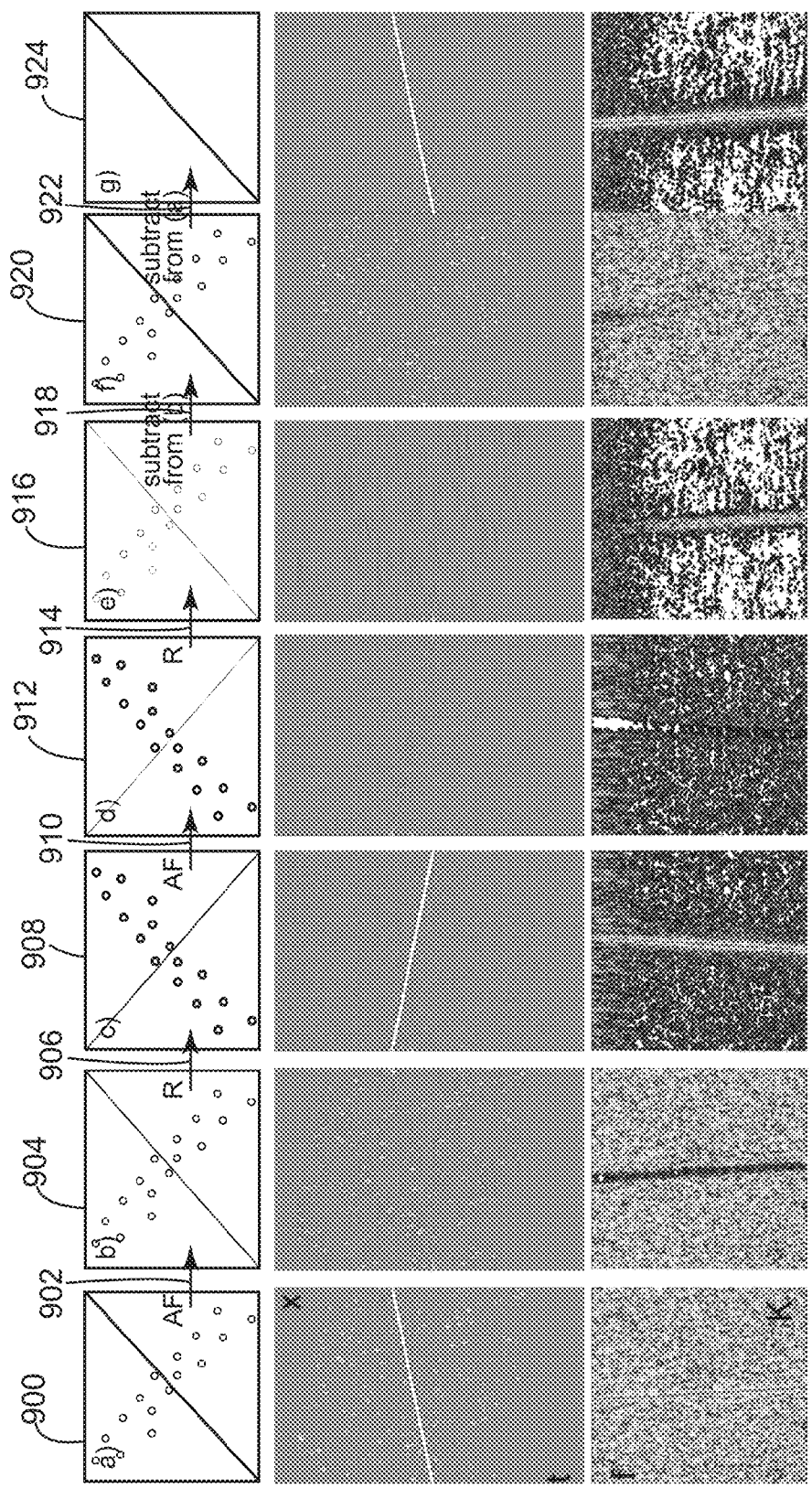
FIG. 9 is a flowchart of a method for deblending seismic data with two annihilation filters.
Figure 10:
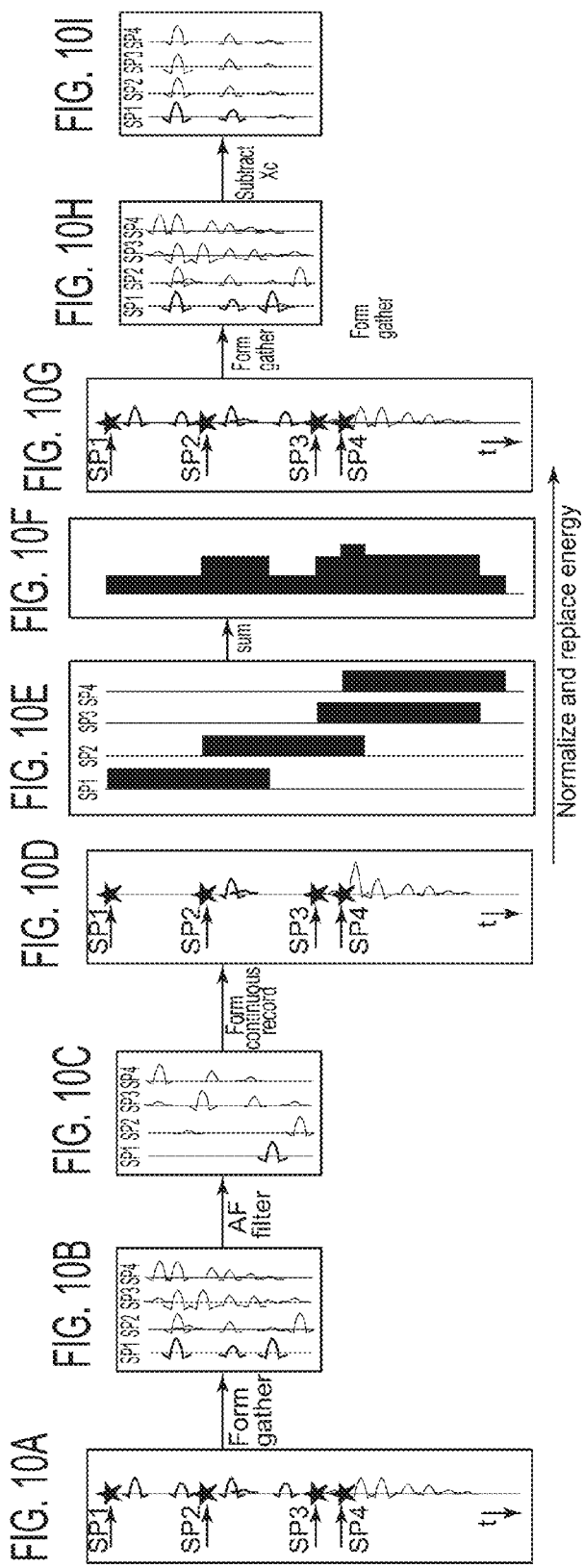

The annihilation filter step (3) used within the deblending flow can have a multitude of forms. In one embodiment, the annihilation filter step is the straight application of an annihilation filter, for example, a dip destruction filter. In an alternative embodiment, the annihilation filter step includes an annihilation workflow, one example of which is illustrated in FIG. 9 and can be described as follows:

1) Receive input data, for example, the output from step (2) in previous flow (for example, step 900 in FIG. 9);
2) Estimate cross-talk noise using an annihilation filter (this estimate will be imperfect) (for example, step 902 in FIG. 9);
3) Rearrange the cross-talk noise to form an associated signal estimate using the firing times. This step may contain signals related to the cross-talk noise as well as additional noise related to the imperfect estimation in step (2) above (for example step 906 in FIG. 9);
4) Select the additional noise by applying an annihilation filter (for example step 910 in FIG. 9);
5) Rearrange the selected noise (using, for example, a convolution step) to calculate an estimate for the error made in step (2) (for example step 914 in FIG. 9); and
6) Subtract the output of step (5) from the output of step (2) to improve the cross-talk noise estimate (for example step 918 in FIG. 9);

The rearrange flow may be defined in different ways depending on the form of the input data. In general, this step can be seen as a convolution performed in the time or frequency domain, which may result in a time shift and/or wavelet reshaping operation. Wavelet re-shaping may be of interest in the case that the sources emit different signals, e.g., different air-gun arrays layout and/or air-gun volume. The time shift incorporated in the convolution may relate to an exact number of samples (e.g., a dirac function) or relate to a sub-sample time shift. In the towed streamer case, where sources fire within a small delay of one another, this may relate to a time shift equal to the difference in firing time between two sources.

One embodiment of rearranging data relating to continuous recording (e.g., land, OBS, towed streamer) can include the following steps, which are also illustrated in FIGS. 10A-H:

1) FIG. 10A shows a continuous recording trace containing the information from four shot points SP1-4. The reflected energy relating to the different shot points overlap.
2) The continuous recording trace is used to construct a receiver gather as shown in FIG. 10B. Each trace in the receiver gather is a copy of a trace segment from FIG. 10A starting at the firing time relating to each shot. This receiver gather contains coherent energy as well as cross-talk noise.
3) An annihilation filter is applied to the receiver gather to create a receiver gather containing a cross-talk noise estimate, as shown in FIG. 10C. This is the output from step (3) from the generalized deblending flow.
4) The method timeshifts each trace by the shot firing time and adds them into the continuous record by summing the receiver gather trace segments into a continuous recording trace based on the firing time (See FIG. 10D). If different sources use different source signatures, this step would also include a re-signature operation. The time shift and/or re-signature may be applied by a convolution in the time or frequency domain.
5) FIG. 10E shows the contribution to the continuous recording trace from each shot point.
6) FIG. 10F shows the sum of the contributions; the number of overlapping traces for every time sample in the continuous recording trace.
7) Normalize the reconstructed continuous recording trace with the number of overlapping traces minus one when more than one trace from the gather contributes to a given sample in the continuous record. Replace with the raw continuous recording data if only one trace from the gather contributes to a given sample in the continuous record (these trace segments are not blended). The result is shown in FIG. 10G.
8) Reform the trace segment gather now containing cross-talk estimate as well as coherent signal, e.g., pseudo-deblending (FIG. 10H)
9) Subtract the output of step (3) from the output of step (8). The result is shown in FIG. 10I and contains the coherent signal.

FIGS. 6-8 illustrated three different schemes of using at least one annihilation filter for deblending seismic data. However, those skilled in the art would understand that other schemes may be designed to use an annihilation filter by itself or in combination with other filters, for example, coherency filters, for deblending seismic data. Therefore, the present invention should not be construed to be limited only to the embodiments of FIGS. 6-8. The above-discussed embodiments may also include specific processing steps that are now discussed.

One step discussed in the above embodiments was rearranging the data so that energy relating to one source is coherent while energy relating to at least one other source appears as incoherent cross-talk noise. This rearranging step can be referred to as pseudo-deblending.

To fully explain this process, the following terms are introduced.

Continuous recording time: this is the time relating to the long continuous recording containing energy relating to all source firings of interest. It may be on the order of an hour to several days or weeks;

Earth response time: this is the time required for all energy of interest associated with the source firings to have been recorded by the receivers; and Listening time: this is the time required to record the earth response plus the source signature length. More specifically, suppose that a vibratory source is used to excite the subsurface. The vibratory source is typically vibrated for a given period of time (e.g., a few seconds), which is called source duration time. Listening time then includes source duration time and earth response time in accounting for all excitations of interest.

According to an embodiment, the pseudo-deblending process may be described by the following pseudo-code:
(1) Initiate computing device;
(2) Loop though shot excitation times. Note that during a seismic survey, each given source array shoots according to a predetermined sequence of shot excitation times. For a traditional seismic survey, each source array may be fired every few seconds during days or weeks;
(3) Extract listening time segment for current shot. It is possible to assign acquisition-related coordinates to this time segment, e.g., shot-x, shot-y, receiver-x, receiver-y, midpoint-x, midpoint-y, inline, crossline, etc.
(4) Optionally, apply source signature compensation, which may include one or more of the following: source array (group) response, source ghost, source static correction, amplitude correction, e.g., based on source coupling.
(5) Optionally apply receiver compensation, which may include one or more of the following: receiver group response, receiver ghost; receiver static correction; amplitude correction, e.g., based on receiver coupling;
(6) Truncate the record to the earth response time; and
(7) Arrange or sort the data according to the acquisition-related coordinates assigned in step (3).

The result of the pseudo-deblending process may be a 2D or 3D volume of traces, for each receiver, with each trace relating to an individual source excitation and receiver position.

Another processing step discussed in the above embodiments is annihilation filtering. Annihilation filtering is applied to the seismic data to remove a significant amount of coherent energy associated with a first source to estimate the remaining cross-talk noise associated with a second source. This result contains most of the cross-talk noise and a strongly attenuated part of the coherent energy.

The annihilation filtering process may contain an individual operation that preserves cross-talk energy while attenuating coherent energy. In addition, the process may contain a combination of individual operations. For example, a denoising or coherency filtering method may be adapted to perform annihilation filtering using an appropriate function "f." In addition, impulsive denoise or "kill fill" strategies may be used in a similar way by calculating a cross-talk estimate as the difference between the input data and the difference after impulsive denoise.

The annihilation filter may include one or more spatial dimensions, depending on the geometry and the filter method. For example, for a seismic survey using towed streamers and two or more sources attached to the same vessel (often termed flip-flop sources) or to different vessels, it is possible to apply the filtering algorithm in 2D, in the common channel, common receiver, common cmp, or other domain where the cross-talk noise may be largely non-continuous/coherent. In the case of ocean-bottom acquisition, filtering may be applied in any spatially-sorted domain (such as a common-receiver or common mid-point domain) where the cross-talk noise is incoherent. Filtering may be applied successively, using more than one algorithm either within one deblending iteration, or a change of algorithm with each iteration. The filtering applications may be in different domains, for example Rank reduction-based filtering in the common channel domain followed by FK (frequency-wavenumber) based filtering in the receiver gather domain. A multi-dimensional spatial filtering (e.g., 3D) may also be used, for example, in the shotx-shoty, shot-channel, or shot-receiver domain. While the data from both sources is continuous in the shot domain, the use of the algorithm in this way will ensure the noise model is consistent from channel to channel.

For ocean bottom (OBS) or land acquisition, if there is 3D coverage of shot positions, there are various methods for filter application. Two examples in a common receiver domain include (1) applying filtering in the inline direction followed by the crossline direction, and (2) applying 3D filtering.

Irrespective of the type of acquisition, different filter sizes may be used for different temporal frequencies or wavenumbers. In one application, the dimensions in which the filter is applied depend on the algorithm. In another application, the filter can be applied on smaller subsets of the first and second data sub-sets, including temporal and spatial sub-windows, or sections (i.e., each line can be processed separately if required, for example, in the case of a towed streamer). The results from each sub-window may then be combined, often using tapering.

The filter can be applied directly, or it can be encompassed by a move-out correction and a reverse move-out correction. The use of a move-out correction (e.g., normal move-out (NMO) or other corrections) may reduce the range of dips in the data, thus making it possible to constrain the filtering method (e.g., range of dips for a tau-p filter). By compensating for timing variations with offset, it may also be possible to constrain the filtering by filters with similar properties for adjacent offsets.

Another processing step discussed in the above embodiments is the subtraction of two data sub-sets. This process refers to the sample-by-sample subtraction of amplitude values from traces in two data sub-sets with corresponding trace locations (defined from the shot and receiver coordinates), and with the time of the shot accounted for appropriately. The subtraction may or may not be calculated adaptively, where a filter is used to modify one or both of the data sub-sets so as to alter the outcome of the subtraction to more closely resemble a desired result. An example of one such filter is the adaption filter g used to minimize the energy of C=A−g*B for data sub-sets A and B.

Figure 11:
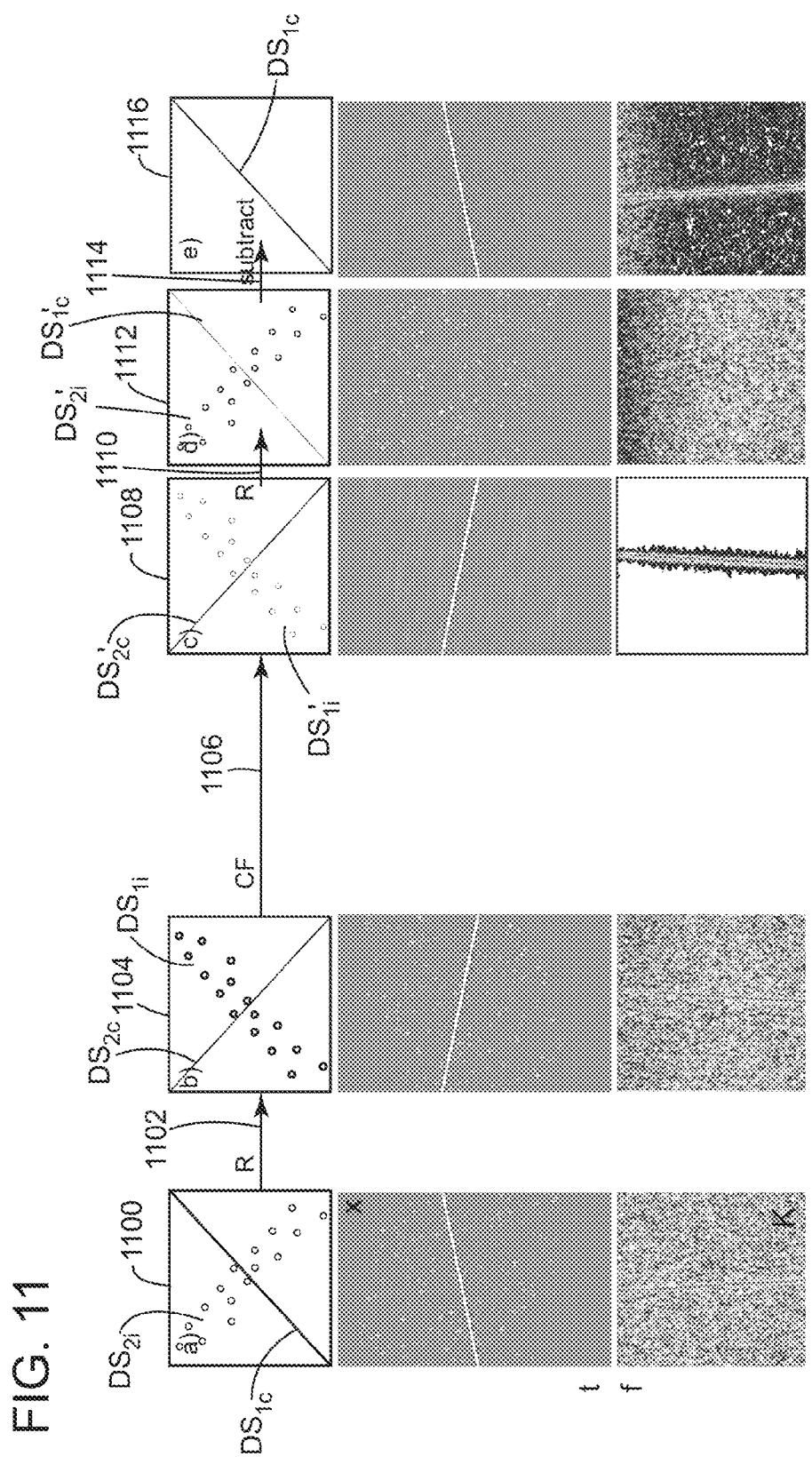
FIG. 11 is a flowchart of a method for deblending seismic data with a coherency filter.

Application of one or more annihilation filters to recorded seismic data, as discussed above, does not degrade the original signal as traditional methods do. In this respect, FIG. 11 contrasts results from a coherency filter method with the method illustrated in FIG. 9. FIG. 11 shows a simple example of coherency filtering-based deblending using a simple synthetic input data set including sub-sets $DS_1$ and $DS_2$. The input data set is time-aligned for the first source array $S_1$ as illustrated in 1100. After applying a time shift in step 1102, the data is time-aligned for source array $S_2$ as illustrated in 1104. A coherency filter is applied in step 1106 to enhance second data sub-set $DS_{2i}'$ and to attenuate the first data sub-set, which is now represented as $DS_{1i}'$. Another time shift is applied in step 1110 to time-align the data based on source array $S_1$, thus estimating the cross-talk relating to source array $S_2$. Cross-talk $DS_{2i}'$ relating to source array $S_2$ is then subtracted in step 1114 from the original data set in 1100 to obtain deblended data $DS_{1c}$ in 1116. Note that the middle panels in the figure show the synthetic data in the t-x domain, while the bottom panels show the same data in the f-k domain.

FIG. 9 shows the same data sub-sets $DS_1$ and $DS_2$ after deblending using the AF-AF route described in the embodiment of FIG. 7. Thus, FIG. 9 shows that input data is time-aligned for source array $S_1$ in 900, then a first annihilation filter is applied in step 902 to calculate cross-talk noise relating to source array $S_2$ as shown in 904, time alignment is applied in step 906 to have the data aligned based on source array $S_2$ in 908, a second annihilation filter is applied in step 910 to partially select residual source array $S_1$-related energy as shown in 912, time align in step 914 $S_1$ residual energy as shown in 916, subtract in step 918 the $S_1$ residual energy from 904 to improve the cross-talk estimate as shown in 920, and convolve (e.g., subtract) in step 922 the cross-talk noise estimated in 920 from the input 900 to obtain deblended data associated with first source array $S_1$ as shown in 924.

Comparing now the results shown in FIG. 11, which were calculated without an annihilation filter, with the results shown in FIG. 9, which were calculated with an annihilation filter, the following observations can be made.

Panel 1112 shows the cross-talk noise that is removed from the input data of panel 1100. The cross-talk noise contains some coherent energy $DS_{1c}'$, which relates to a component of cross-talk noise visible in panel 1108. Subtraction of this energy from 1100 will result in some signal damage. This is a feature shared by many methods that use only coherency filters and no annihilation filter.

Contrary to this, the cross-talk noise in 920 has a substantially lower level of coherent energy, thus making the resulting deblended data more signal-preserving. In this regard, a comparison of the results shown in 1116 and 924 show that there is significantly less residual cross-talk noise in the AF-AF result (panel 924).

Figure 12:
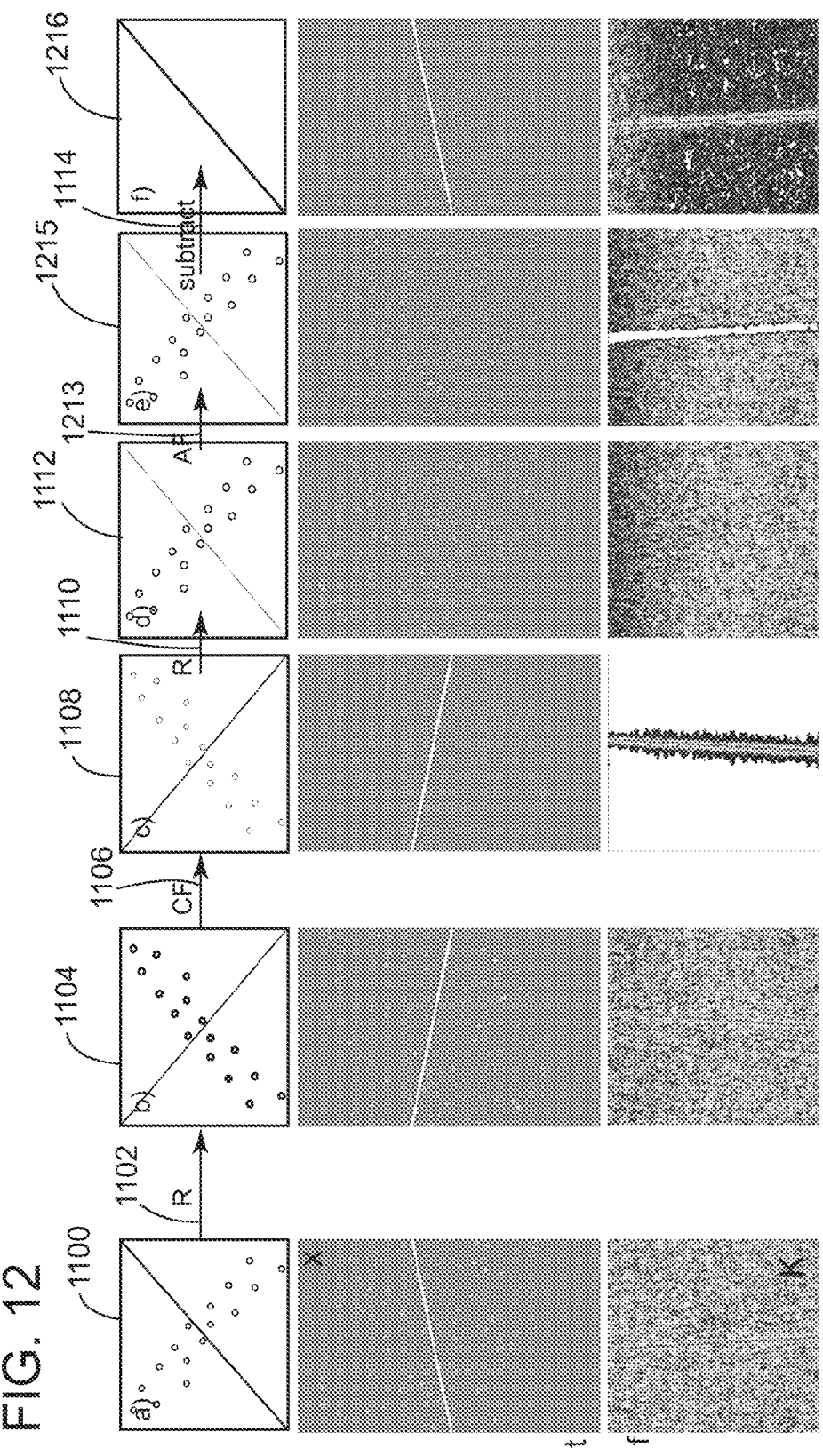
FIG. 12 is a flowchart of a method for deblending seismic data with a coherency filter and an annihilation filter.

According to another embodiment, the results of FIG. 11 could be improved by using an annihilation filter to remove the coherent energy in panel 1112. More specifically, FIG. 12 shows the flow of FIG. 11 adapted to use the annihilation filter in addition to the coherency filter. The steps identical to those in FIG. 11 are labeled similarly. New step 1213 shows the application of the annihilation filter to estimate cross-talk noise relating to source array $S_2$, which is then convolved (e.g., subtracted) in step 1114 from the time-aligned data for source array $S_1$ from panel 1100 to obtain the improved deblended data of panel 1216.

These figures show that coherency filter-based methods will always select a component of the cross-talk noise and hence result in some signal damage when sorted/time aligned to attenuate cross-talk. The use of annihilation filtering methods, on the other hand, can avoid this problem and provide superior results.

Figure 13:
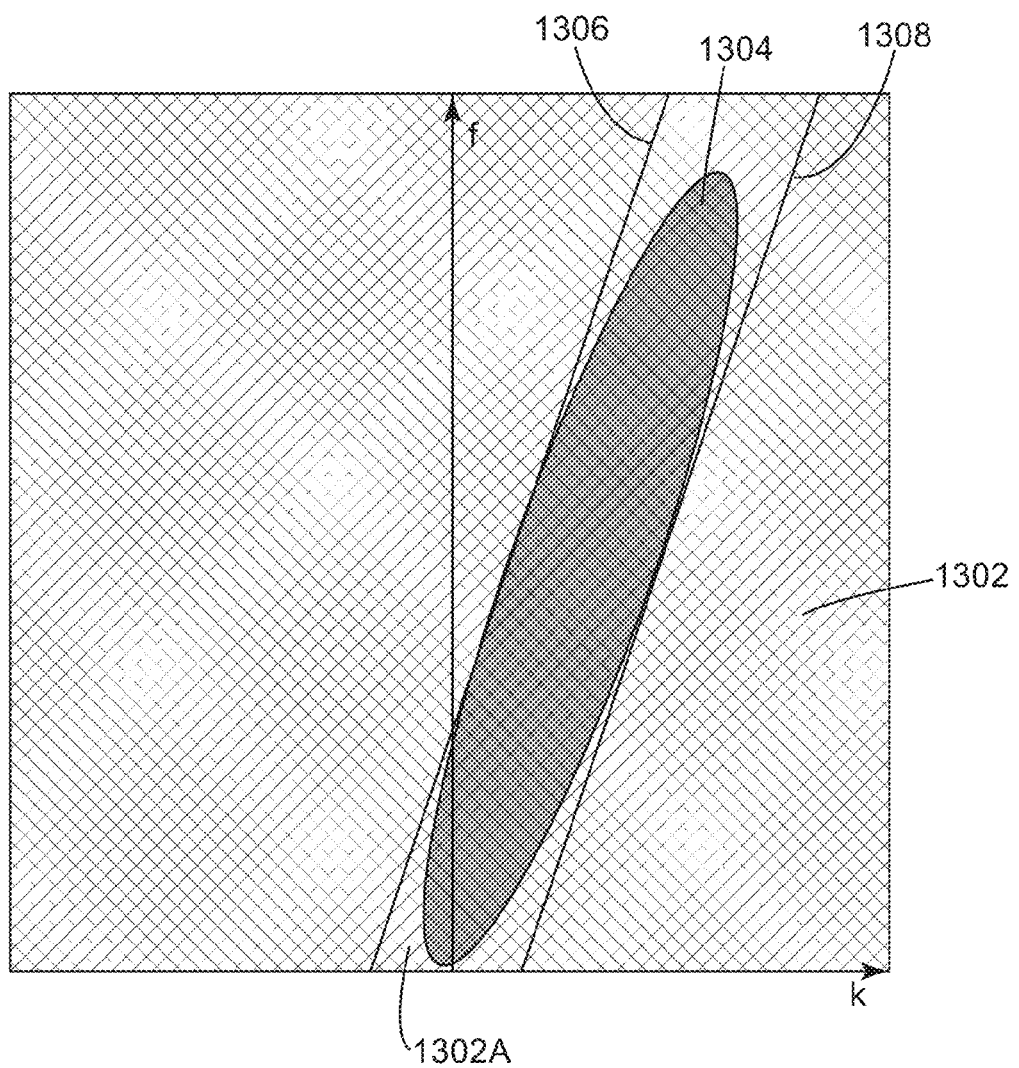
FIG. 13 schematically illustrates how using an annihilation filter is superior to using a coherency filter.

This advantage of annihilation filtering methods is further illustrated in FIG. 13. In FIG. 13, which plots energy in the f-k domain, area 1302 represents cross-talk noise in the f-k domain for source $S_2$, whereas area 1304 represents the coherent energy for source $S_1$. It should be noted that a part 1302A of area 1302 is below area 1304. When the data is time-aligned for second source $S_2$, cross-talk noise 1302 is time-aligned as the new coherent signal, while the coherent energy 1304 is de-aligned and becomes the new cross-talk noise.

An exemplary coherency filtering method keeps all the energy (both coherent 1304 and a portion of incoherent energy 1302A) between lines 1306 and 1308 while rejecting everything else. The filtered data now contains mainly coherent signal 1304 and some of cross-talk noise 1302A. This is so even when a perfect selection of the signal area is achieved, because the portion of cross-talk noise 1302A residing "below" the signal area 1304 is inherently selected.

Time-aligning this result for source $S_2$ leads to a complete representation of the new cross-talk noise and a weak representation of the coherent signal (as previously shown in panel 1112). Subtracting this energy from the input data results in a significant reduction of cross-talk noise, while at the same time damaging a proportion of the desired signal.

However, this is not the case when the annihilation filtering method is used. An exemplary annihilation filtering method rejects everything between lines 1306 and 1308 while keeping everything else. The result contains only cross-talk noise 1302 (although an incomplete representation because 1302A has been removed) and no coherent signal 1304. Time-aligning these results leads to good representation of the new coherent signal without any new cross-talk noise. Following one of the approaches described above for annihilation filtering methods, for example, the one shown in FIG. 7, leads to an improvement of the result as was shown in FIG. 9. This highlights that the annihilation filtering method can avoid the problem of signal damage, which is inherent in the coherency filtering-based approach.

The methods discussed above may be considered, in one embodiment, only as a first step of an iterative process for deblending data. In other words, deblending using annihilation filtering may be applied repeatedly to seismic data for improving the signal. For example, assuming that a seismic survey has been performed with two sources $S_1$ and $S_2$, there are different ways the iterations can be performed. The process of estimating cross-talk noise in the following descriptions can be any process that attenuates a significant portion of the coherent energy while keeping the incoherent cross-talk noise, e.g., any of the previously described annihilation filtering methods.

A first approach is illustrated in FIG. 14. Panel 1402 shows the initial first and second data sub-sets $DS_1$ and $DS_2$ recorded simultaneously for sources $S_1$ and $S_2$. The data is sorted so that energy associated with source $S_1$ is coherent ($DS_{1c}$ is distributed along a line while $DS_{2i}$ appears to be random). In step 1404, the cross-talk noise $DS_{2i}'$ related to source $S_2$ is estimated as illustrated in 1406. Step 1404 includes applying at least one annihilation filter as discussed with the embodiments illustrated in FIGS. 6-8. Cross-talk noise $DS_{2i}'$ is subtracted in step 1408 from the input data at 1402 to obtain deblended first data sub-set $DS_{1c}''$. Attenuated incoherent energy $DS_{2i}''$ may also be seen in 1410. This result can be used as input for the next iteration, which is similar to steps 1420 to 1410 except that the time alignment is now made relative to second source $S_2$. The above steps may be repeated to incrementally attenuate the cross-talk noise.

A different approach is now discussed with respect to the embodiment shown in FIG. 15. The same first and second data sub-sets $DS_1$ and $DS_2$ are considered the input data. The data sub-sets are time-aligned so that the data of source $S_1$ is coherent, as illustrated in 1502. Cross-talk noise $DS_{2i}'$ related to source $S_2$ is estimated by applying at least one annihilation filtering method in step 1504, as illustrated in 1506. Cross-talk noise $DS_{2i}'$ is then time-sorted in step 1508 so that energy associated with source $S_2$ is coherent, as illustrated in 1510.

This result is subtracted in step 1512 from the input data, which is sorted so that energy associated with source $S_2$ is coherent, as illustrated in 1514, to estimate the cross-talk noise related to source $S_1$, as illustrated in 1516. This result can be used as input for the next iteration. The process described with regard to steps 1502 to 1516 is repeated for source $S_2$ to obtain source $S_1$'s signal estimate and source $S_2$'s noise estimate. These steps may be repeated to incrementally attenuate the cross-talk noise.

According to another embodiment, an alternative version of the approach illustrated in FIG. 15 is now briefly discussed. This method follows the previous approach to obtain source $S_2$'s signal estimate, source $S_1$'s noise estimate, source $S_1$'s signal estimate, and source $S_2$'s noise estimate.

Then, the process uses source $S_2$'s signal estimate and source $S_2$'s noise estimate and sorts them so that the same source is coherent in both data sub-sets. The two data sub-sets are then combined using, e.g., adaptive subtraction, to improve the quality of the result. The same process can be repeated for source $S_1$'s signal estimate and source $S_1$'s noise estimate.

The cross-talk noise estimate obtained based on any of the above methods may then be used to:
Attenuate cross-talk noise from the original seismic data;
Re-arranged to form a representation of signal;
Separate energy relating to two or more sources that were simultaneously shot;
Attenuate interference noise from the seismic data;
Build sparseness weights;
Combine with another deblending strategy (e.g., simultaneous modelling, impulsive denoise, coherency filtering, etc.); and
Highlight the spatio-temporal significance of cross-talk noise (i.e., "change map").

Figure 16:
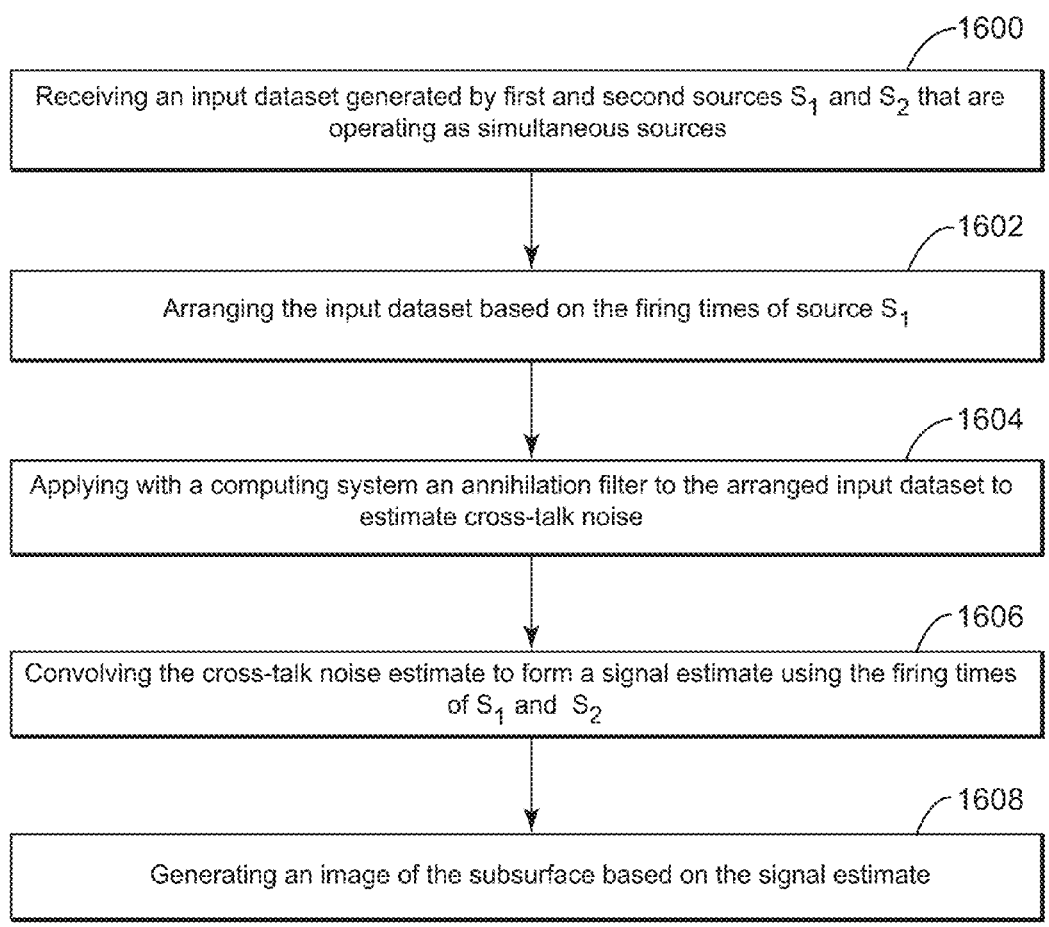
FIG. 16 is a flowchart of a method for applying an annihilation filter for deblending seismic data.

A method for implementing the novel features noted above is now discussed with regard to FIG. 16. According to an exemplary embodiment, a method for deblending seismic data associated with a subsurface of the earth includes a step 1600 of receiving an input a dataset generated by first and second sources $S_1$ and $S_2$ that are operating as simultaneous sources, a step 1602 of arranging the input dataset based on the firing times of source $S_1$, a step 1604 of applying with a computing system an annihilation filter to the arranged input dataset to estimate cross-talk noise, a step 1606 of convolving the cross-talk noise estimate to form a signal estimate using the firing times of $S_1$ and $S_2$, and a step 1608 of generating an image of the subsurface based on the signal estimate.

Figure 17:
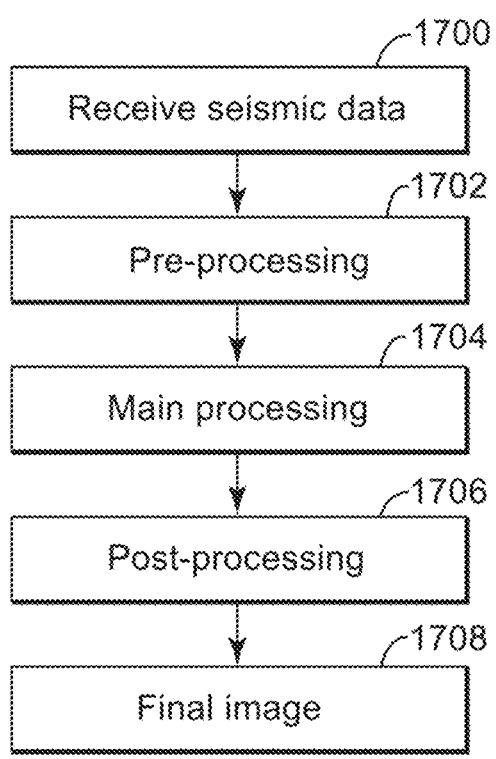
FIG. 17 is a flowchart of a method for processing seismic data to obtain an image of the surveyed subsurface.

Seismic data recorded with simultaneous shooting as discussed above may be processed in a corresponding processing device for generating an image of the surveyed subsurface as discussed now with regard to FIG. 17. For example, the seismic data collected with the characteristics noted above may be received in step 1700 at the processing device. In step 1702, pre-processing methods are applied, e.g., demultiple, signature deconvolution, trace summing, motion correction, vibroseis correlation, resampling, deblending as discussed with regard to FIGS. 6-8. In step 1704, the main processing takes place, e.g., deconvolution, amplitude analysis, statics determination, common middle point gathering, velocity analysis, normal move-out correction, muting, trace equalization, stacking, noise rejection, amplitude equalization, etc. In step 1706, final or post-processing methods are applied, e.g., migration, wavelet processing, seismic attribute estimation, inversion, etc., and in step 1708 the final image of the subsurface is generated. Note that at least one process in step 1702 involves applying an annihilation filtering method to two or more seismic data sub-sets that are blended together. Also note that a result of this processing may result in an improvement of the image of the surveyed subsurface and/or increase efficiency in acquiring the seismic data. The improved image quality will result in an increased likelihood of finding oil and gas reservoirs.

Figure 18:
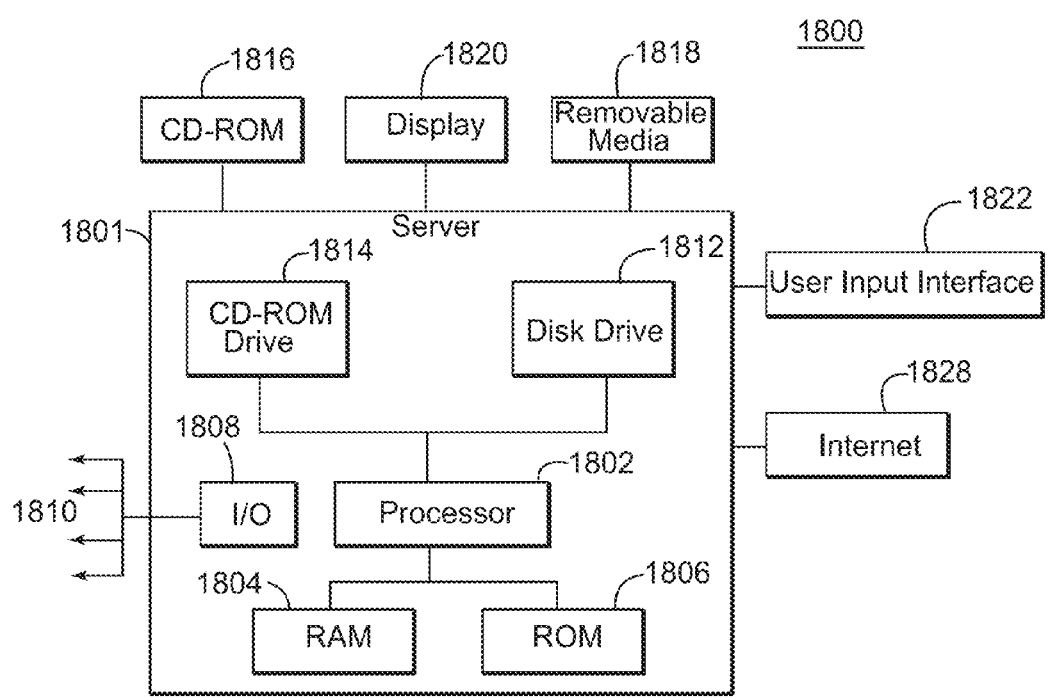
FIG. 18 is a schematic diagram of a computing device that implements a method for deblending data.

The above method and others may be implemented in a computing system specifically configured to calculate the image of the subsurface. An example of a representative computing system capable of carrying out operations in accordance with the exemplary embodiments is illustrated in FIG. 18. Hardware, firmware, software or a combination thereof may be used to perform the various steps and operations described herein.

The exemplary computing system 1800 suitable for performing the activities described in the exemplary embodiments may include a server 1801. Such a server 1801 may include a central processor (CPU) 1802 coupled to a random access memory (RAM) 1804 and to a read-only memory (ROM) 1806. The ROM 1806 may also be other types of storage media to store programs, such as programmable ROM (PROM), erasable PROM (EPROM), etc. The processor 1802 may communicate with other internal and external components through input/output (I/O) circuitry 1808 and bussing 1810, to provide control signals and the like. The processor 1802 carries out a variety of functions as are known in the art, as dictated by software and/or firmware instructions.

Server 1801 may also include one or more data storage devices, including a hard drive 1812, CD-ROM drives 1814, and other hardware capable of reading and/or storing information such as DVD, etc. In one embodiment, software for carrying out the above-discussed steps may be stored and distributed on a CD- or DVD-ROM 1816, removable memory device 1818 or other form of media capable of portably storing information. These storage media may be inserted into, and read by, devices such as the CD-ROM drive 1814, the disk drive 1812, etc. Server 1801 may be coupled to a display 1820, which may be any type of known display or presentation screen, such as LCD, LED displays, plasma displays, cathode ray tubes (CRT), etc. A user input interface 1822 is provided, including one or more user interface mechanisms such as a mouse, keyboard, microphone, touchpad, touch screen, voice-recognition system, etc.

Server 1801 may be coupled to other computing devices, such as landline and/or wireless terminals, via a network. The server may be part of a larger network configuration as in a global area network (GAN) such as the Internet 1828, which allows ultimate connection to various landline and/or mobile client devices. The computing device may be implemented on a vehicle that performs a land seismic survey.

The disclosed exemplary embodiments provide a system and a method for deblending recorded seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Abma, R. & Yan, J. [2009] Separating simultaneous sources by inversion, 71st EAGE Conference & Exhibition.

Abma, R. [2010] Method for separating independent simultaneous sources, US patent.

Akerberg et al., [2008] Simultaneous source separation by sparse Radon transform, 78th Ann. Internat. Mtg.: Soc. of Expl. Geophys.

Hampson, D., [1986], Inverse velocity stacking for multiple elimination: 56th Annual International Meeting, SEG, Expanded Abstracts, Session:S6.7.

Herrmann et al., [2000], De-aliased, high-resolution Radon transforms: 70th Annual International Meeting, SEG, Expanded Abstracts, 1953-1956.

Hampson, G., Stefani, J., and Herkenhoff, F. [2008] Acquisition using simultaneous sources, *Leading Edge*, Vol. 27 No. 7, July 2008.

Maraschini et al., [2012] Source Separation by Iterative Rank Reduction—Theory and Applications, 74th EAGE Conference & Exhibition.

Maraschini et. al., [2012b] An iterative SVD method for deblending: theory and examples. SEG.

Moore et al., [2008] Simultaneous source separation using dithered sources. 78th Ann. Internat. Mtg.: Soc. of Expl. Geophys.

Moore et al., [2010] Separating seismic signals produced by interfering seismic sources, US patent.

Peng et al., [2013] Deblending of Simulated Simultaneous Sources Using an Iterative Approach—an Experiment with Variable-depth Streamer Data, 75th EAGE Conference & Exhibition.

Stefani, J., Hampson, G., and Herkenhoff, E. [2007] Acquisition using simultaneous sources. 69th EAGE Conference & Exhibition.

Trad et al., [2012] Fast and robust deblending using Apex Shifted Radon transform, SEG expanded abstracts 2012.

Mahdad et al., [2012] Iterative method for the separation of blended seismic data: discussion on the algorithmic aspects, *Geophysical Prospecting* 60.4 (2012): 782-801.

Soubaras, R. [1994] Signal-preserving random noise attenuation by the f-x projection, 1994 *SEG Annual Meeting*. Society of Exploration Geophysicists.

Fomel, S. [2002] Application of plane-wave destruction filters, *Geophysics* 67.6 (2002): 1946-1960.

Canales, L. [1984] Random Noise Reduction, 1984 SEG Annual Meeting. Society of Exploration Geophysicists.

Trickett et al., [2012] Robust rank-reduction filtering for erratic noise, SEG 2012.

Peng et al., [2013] Shear Noise Attenuation and PZ Matching for OBN Data with a New Scheme of Complex Wavelet Transform, 75*th EAGE Conference & Exhibition incorporating SPE EUROPEC* 2013.

Neelamani, R., et al. [2008] Coherent and random noise attenuation using the curvelet transform, *The Leading Edge* 27.2 (2008): 240-248.

Herrmann, P., et al. [2000] De-aliased, high-resolution Radon transforms. *Society of Exploration Geophysicists* 70*th Annual International Meeting, SP*2. Vol. 3.

Huaien, W., et al. [1989] Attenuation of Marine Coherent Noise, SEG Expanded Abstracts, 1989.

Lynn, W., et al. [1987] Experimental investigation of interference from other seismic crews, *Geophysics* 52.11 (1987): 1501-1524.

Haldorsen, J. and Farmer, P [1989] Suppression of high-energy noise using an alternative stacking procedure, *Geophysics* 54.2 (1989): 181-190.

Elboth et al., [2010] Time-frequency seismic data de-noising. *Geophysical Prospecting*, 58: 441-453.

Poole, G. [2011] Multi-dimensional coherency driven denoising of irregular data, EAGE conference proceedings, 0009.

Stewart R. Trickett, F-xy eigenimage noise suppression, Geophysics March 2003, Vol. 68, No. 2, pp. 751-759.

Trickett et al., Interpolation using Hankel tensor completion, SEG Technical Program Expanded Abstracts 2013: 3634-3638.

Freire, S. L. M. and Ulrych, T. J. [1989] Application of singular value decomposition to vertical seismic profiling: *Geophysics*, 53, 778-785.

Treitel et al., [1967] Some aspects of fan filtering: *Geophysics*, 32, 789-800.

Vaage, S. [2003] Method for separating seismic signals from two or more distinct sources, U.S. Pat. No. 6,882,938.

Xu, S., and D. Pham [2004] Seismic data regularization with anti-leakage Fourier transform: 66th Annual International Meeting: EAGE, Extended Abstracts, D032.

What is claimed is:

1. A method for deblending seismic data associated with a subsurface of the earth, the method comprising:

receiving an input dataset generated by source excitations of first and second sources $S_1$ and $S_2$;

receiving source excitation times for the first source $S_1$ and the second source $S_2$;

applying, with a computing system, an annihilation filter to the input dataset, using the source excitation times for the first source $S_1$, to estimate a data sub-set relating to the second source $S_2$;

convolving the data sub-set with an operator to form a signal estimate associated with the second source $S_2$, using the source excitation times of the first and second sources $S_1$ and $S_2$; and generating an image of the subsurface, based on the signal estimate associated with the second source $S_2$, to identify geophysical structures, wherein the annihilation filter removes coherent energy while a coherency filter removes incoherent energy.

2. The method of claim 1, wherein the step of convolving involves a time shift relating to the difference in firing time of $S_1$ and $S_2$.

3. The method of claim 1, wherein the operator represents a filter that transforms energy arranged based on the source excitation times of source $S_1$ to equivalent energy arranged based on the source excitation times of source $S_2$.

4. The method of claim 1, wherein the operator encodes a source signature when transforming energy.

5. The method of claim 1, wherein the step of convolving involves reconstructing traces based on source excitation times relating to a continuous recording trace.

6. The method of claim 1, further comprising:
arranging the input dataset based on the source excitation times of the first source $S_1$.

7. The method of claim 6, further comprising:
subtracting the data sub-set or the signal estimate from the input dataset to obtain a residual dataset; and
applying the annihilation filter to the residual dataset.

8. The method of claim 1, where the annihilation filter includes the application of one or more filtering processes.

9. The method of claim 1, further comprising:
applying a coherency filter to the data sub-set or the signal estimate.

10. The method of claim 1, wherein the data sub-set includes cross-talk noise.

11. The method of claim 1, wherein the data sub-set includes interference noise.

12. A computing device for deblending seismic data associated with a subsurface of the earth, the computing device comprising:

an interface for receiving an input dataset generated by source excitations of first and second sources $S_1$ and $S_2$ and source excitation times for the first source $S_1$ and the second source $S_2$; and a processor connected to the interface and configured to, apply an annihilation filter to the input dataset, using the source excitation time for the first source $S_1$, to estimate a data sub-set relating to the second source $S_2$;

convolve the data sub-set with an operator to form a signal estimate associated with the second source $S_2$, using the source excitation times of $S_1$ and $S_2$; and generate an image of the subsurface, based on the signal estimate associated with the second source $S_2$, to identify geophysical structures, wherein the annihilation filter removes coherent energy while a coherency filter removes incoherent energy.

13. The device of claim 12, wherein the processor is further configured to apply a time shift relating to the difference in firing time of $S_1$ and $S_2$ when convolving.

14. The device of claim 12, wherein the operator represents a filter that transforms energy arranged based on the source excitation times of source $S_1$ to equivalent energy arranged based on the source excitation times of source $S_2$.

15. The device of claim 12, wherein the operator encodes a source signature when transforming energy.

16. The device of claim 12, wherein the step of convolving involves reconstructing traces based on source excitation times relating to a continuous recording trace.

17. The device of claim 12, wherein the processor is further configured to:
arrange the input dataset based on the source excitation times of the first source $S_1$.

18. The device of claim 17, wherein the processor is further configured to:
subtract the data sub-set or the signal estimate from the input dataset to obtain a residual dataset; and
apply the annihilation filter to the residual dataset.

19. The device of claim 12, wherein the data sub-set includes cross-talk noise.

20. The device of claim 12, wherein the data sub-set includes interference noise.

21. A non-transitory computer readable medium including computer executable instructions, wherein the instructions, when executed by a computer, implement a method for deblending seismic data associated with a subsurface of the earth, the method comprising:
receiving an input dataset generated by source excitations of first and second sources $S_1$ and $S_2$;
receiving source excitation times for the first source $S_1$ and the second source $S_2$;
applying an annihilation filter to the input dataset, using the source excitation times for the first source $S_1$, to estimate a data sub-set relating to the second source $S_2$;
convolving the data sub-set with an operator to form a signal estimate associated with the second source $S_2$, using the source excitation times of the first source $S_1$ and the second source $S_2$; and
generating an image of the subsurface, based on the signal estimate associated with the second source $S_2$, to identify geophysical structures,
wherein the annihilation filter removes coherent energy while a coherency filter removes incoherent energy.

* * * * *